(12) United States Patent
Vankamamidi et al.

(10) Patent No.: US 11,960,498 B2
(45) Date of Patent: *Apr. 16, 2024

(54) SYSTEMS AND METHODS FOR DYNAMICALLY RENDERING DATA LINEAGE

(71) Applicant: Microsoft Technology Licensing, LLC, Redmond, WA (US)

(72) Inventors: Sandhya Vankamamidi, Redmond, WA (US); Jung-Chen Hung, Seattle, WA (US); Mark Wade Heninger, Preston, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 942 days.

This patent is subject to a terminal disclaimer.

(21) Appl. No.: 15/368,091

(22) Filed: Dec. 2, 2016

(65) Prior Publication Data
US 2018/0089291 A1 Mar. 29, 2018

Related U.S. Application Data

(60) Provisional application No. 62/495,582, filed on Sep. 29, 2016.

(51) Int. Cl.
*G06F 16/24* (2019.01)
*G06F 16/2455* (2019.01)
(Continued)

(52) U.S. Cl.
CPC ........ *G06F 16/258* (2019.01); *G06F 16/2455* (2019.01); *G06Q 10/0637* (2013.01); *G06Q 40/00* (2013.01)

(58) Field of Classification Search
CPC .............. G06F 16/2455; G06F 16/258; G06Q 10/0637; G06Q 40/00
See application file for complete search history.

(56) References Cited

U.S. PATENT DOCUMENTS 5,546,529 A * 8/1996 Bowers ................. G06F 3/0489
715/848
6,144,962 A * 11/2000 Weinberg ................ G06F 11/32
(Continued)

OTHER PUBLICATIONS

"Final Office Action Issued in U.S. Appl. No. 15/368,044", dated May 13, 2020, 21 Pages.
(Continued)

*Primary Examiner* — Eliyah S. Harper
(74) *Attorney, Agent, or Firm* — Ray Quinney & Nebeker; James Bullough

(57) ABSTRACT

A system displays summaries of relationships of a selected data asset with other data assets at a limited number of levels upstream and downstream from the selected data asset in rows above and below the selected data asset. In each row, data assets are arranged in order of usage, with most used data asset displayed directly above or below the selected data asset. The user views grandparent-level data assets of a parent-level data asset that is directly above the selected data asset. The system includes a carousel feature to further navigate the lineage data upstream or downstream. By selecting a new data asset in the parent row, the user can view grandparent-level data assets of the newly selected data asset. The user can view multiple upstream or downstream levels arranged in respective rows displayed above or below the selected data asset. The system can analyze data from any application.

18 Claims, 22 Drawing Sheets

(51) Int. Cl.
   *G06F 16/25*     (2019.01)
   *G06Q 10/0637*   (2023.01)
   *G06Q 40/00*     (2023.01)

(56) References Cited

U.S. PATENT DOCUMENTS

| | | | |
|---|---|---|---|
| 6,343,295 | B1 | 1/2002 | MacLeod et al. |
| 6,434,558 | B1* | 8/2002 | MacLeod ............... G06F 16/284 |
| 7,493,570 | B2 | 2/2009 | Bobbin et al. |
| 7,734,619 | B2 | 6/2010 | Vierich et al. |
| 9,075,780 | B2 | 7/2015 | Bonk et al. |
| 9,348,879 | B2 | 5/2016 | Mohammad et al. |
| 9,830,369 | B1* | 11/2017 | Ben-Natan ............... G06F 16/22 |
| 10,025,878 | B1 | 7/2018 | Lefever et al. |
| 10,110,415 | B2 | 10/2018 | Radivojevic et al. |
| 10,169,601 | B2* | 1/2019 | Arasan ................. G06F 21/6227 |
| 10,452,625 | B2* | 10/2019 | Mukherjee ............. G06F 16/287 |
| 10,671,629 | B1* | 6/2020 | Richt ...................... G06F 16/26 |
| 10,915,545 | B2 | 2/2021 | Vankamamidi et al. |
| 2002/0073008 | A1 | 6/2002 | Dutta et al. |
| 2003/0093483 | A1* | 5/2003 | Allen ................... G06Q 10/107 |
| | | | 709/207 |
| 2003/0106076 | A1 | 6/2003 | Stanford et al. |
| 2006/0106755 | A1* | 5/2006 | Stuhec ................... G06Q 10/10 |
| 2007/0061353 | A1* | 3/2007 | Bobbin ............... G06F 3/04842 |
| 2009/0049372 | A1* | 2/2009 | Goldberg ............. G06F 16/283 |
| | | | 715/227 |
| 2009/0216728 | A1* | 8/2009 | Brainerd ............... G06F 16/248 |
| 2011/0066602 | A1* | 3/2011 | Studer ................... G06F 40/226 |
| | | | 707/690 |
| 2011/0265188 | A1* | 10/2011 | Ramaswamy ........ G06F 21/604 |
| | | | 726/28 |
| 2011/0320460 | A1* | 12/2011 | Fankhauser ............ G06Q 10/10 |
| | | | 707/748 |
| 2012/0173747 | A1 | 7/2012 | Roesch et al. |
| 2012/0271867 | A1 | 10/2012 | Grossman et al. |
| 2012/0310875 | A1* | 12/2012 | Prahlad ............... G06F 16/2465 |
| | | | 707/602 |
| 2013/0268855 | A1* | 10/2013 | O'Byrne ............... G06F 16/254 |
| | | | 715/711 |
| 2014/0019423 | A1 | 1/2014 | Liensberger et al. |
| 2014/0114905 | A1 | 4/2014 | Kozina et al. |
| 2014/0114907 | A1* | 4/2014 | Kozina ................. G06F 16/219 |
| | | | 707/602 |
| 2014/0180961 | A1* | 6/2014 | Hankins ................ G06F 40/197 |
| | | | 705/348 |
| 2016/0028580 | A1* | 1/2016 | Radivojevic ........ H04L 41/0213 |
| | | | 709/223 |
| 2016/0232230 | A1* | 8/2016 | Radivojevic ............ G06F 16/26 |
| 2016/0285701 | A1* | 9/2016 | Khandelwal ........... G06Q 10/10 |
| 2016/0364434 | A1* | 12/2016 | Spitz ..................... G06F 16/215 |
| 2017/0024515 | A1* | 1/2017 | Ebberson ................ G06F 16/51 |
| 2017/0033971 | A1* | 2/2017 | Radivojevic ........ H04L 41/0213 |
| 2017/0154087 | A1* | 6/2017 | McClure ............ G06Q 10/0633 |
| 2021/0124755 | A1 | 4/2021 | Vankamamidi et al. |

OTHER PUBLICATIONS

"International Search Report and Written Opinion Issued in PCT Application No. PCT/US2017/052840", dated Nov. 23, 2017, 13 Pages.

"Non Final Office Action Issued in U.S. Appl. No. 17/141,213", dated Feb. 16, 2022, 10 Pages.

"Notice of Allowance Issued in U.S. Appl. No. 17/141,213", dated May 26, 2022, 11 Pages.

McIntosh, et al., "Understanding Change in the Enterprise", Published on: May 9, 2015 Available at: https://support.sas.com/resources/papers/proceedings14/SAS396-2014.pdf.

Lanzoni, Furio, "Metadata Manager", Published on: Jul. 22, 2010 Available at: https://www.google.co.in/url?sa=t&rct=j&q=&esrc=s&source=web&cd=9&cad=rja&uact=8&ved=0ahUKEwj9qdDk89TOAhVJPY8KHZqECfkQFghHMAg&url=http%3A%2F%2Fwww.inteligencija.com%2Findex.php%2Fhr%2Fmdm-white-papers63232%3Fdownload%.

Marchant, Hayden, "Exploring data lineage: Get a complete picture of your data flows", Published on: Jan. 7, 2010 Available at: http://www.ibm.com/developerworks/data/library/techarticle/dm-1001datalineageinfosphereworkbench/dm-1001datalineageinfosphereworkbench-pdf.pdf.

"Data Lineage and Impact Analysis", Retrieved on: Aug. 19, 2016 Available at: http://www.dlineage.com/assets/downloads/Data Lineage and Impact Analysis.pdf.

"The Microsoft Data Warehousing Strategy", Published on: Jul. 11, 1998 Available at: https://msdn.microsoft.com/en-us/library/aa226252(v=sql.70).aspx.

"Working with Oracle Data Integrator Console", Published on: Apr. 11, 2012 Available at: https://docs.oracle.com/cd/E14571_01/integrate.1111/e12643/odi_console.htm#ODIDG1263.

"Notice of Allowance Issued in U.S. Appl. No. 15/368,044", dated Sep. 3, 2020, 11 Pages.

"Non Final Office Action Issued in U.S. Appl. No. 15/368,044", dated Oct. 31, 2019, 17 Pages.

\* cited by examiner

SYSTEMS AND METHODS FOR DYNAMICALLY RENDERING DATA LINEAGE

CROSS-REFERENCE TO RELATED APPLICATIONS

This application claims the benefit of U.S. Provisional Application No. 62/495,582, filed on Sep. 29, 2016. The entire disclosure of the application referenced above is incorporated herein by reference.

FIELD

The present disclosure relates generally to data lineage and more particularly to systems and methods for dynamically rendering data lineage to efficiently and interactively search, retrieve, and evaluate the data lineage.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Lineage of data (data lineage) shows where the data originates upstream, how the data moves and is modified through its life cycle, and which other data uses it downstream. Data lineage describes what happens to the data as the data goes through diverse processes through its life cycle. Data lineage helps provide visibility into analytics pipeline and simplifies tracing errors back to their sources. Data lineage also enables replaying portions of dataflow for step-wise debugging or regeneration of data.

Data lineage provides a visual representation that helps in discovering and exploring flow/movement of data from its source to destination and various changes it undergoes during its life cycle in an enterprise. Data lineage represents how the data hops between various data points, how the data gets transformed along the way, how the representation and parameters of the data change, and how the data splits or converges after each hop.

Data lineage representations can be useful in many ways. For example, big data analytics can use data lineage representations. Big data analytics is a process of examining large data sets to uncover hidden patterns, unknown correlations, market trends, customer preferences, and other useful business information. For example, the big data analytics may apply machine learning algorithms to the data which transform the data. Due to the sheer size of the data, there could be unknown features in the data including outliers, and it can be difficult for data scientists to debug unexpected results.

Further, the massive scale and unstructured nature of data, the complexity of these analytics pipelines, and long run-times pose significant manageability and debugging challenges. A single error in these analytics can be difficult to identify and remove. While one may debug errors by re-running the entire analytics through a debugger for step-wise debugging, such a process can be expensive due to the amount of time and resources needed. Auditing and data validation are other major problems due to the growing ease of access to relevant data sources for use in experiments, sharing of data between scientific communities, and use of third-party data in business enterprises. In today's competitive business environment, companies not only have to find and analyze the relevant data they need, but they also need to find it quickly. The challenge is processing the sheer volume of data and accessing the level of detail needed at a high speed. The challenge grows as the degree of granularity increases.

Big data platforms have a complicated structure. Data are distributed among several systems. Debugging of a big data pipeline becomes challenging because of the very nature of the system. It is not an easy task for a data scientist to figure out which system's data has outliers and unknown features causing a particular algorithm to give unexpected results.

Data lineage can be used to make the debugging of big data pipeline easier. This necessitates collection of data about data transformations. Data lineage provides a historical record of the data and its origins. The lineage of data which is generated by complex transformations such as workflows can be valuable to data scientists. From data lineage, one can ascertain the quality of the data based on its ancestral data and derivations, track back sources of errors, allow automated re-enactment of derivations to update data, and provide attribution of data sources, for example. Data lineage is also useful in the business domain where it can be used, for example, to drill down to the source of data in a data warehouse, track the creation of intellectual property, and provide an audit trail for regulatory purposes.

SUMMARY

A system comprises a processor and machine readable instructions stored on a tangible machine readable medium. When executed by the processor, the machine readable instructions configure the system to process data associated with lineage of a selected data asset, the processed data indicating relationship of the selected data asset with data assets upstream or downstream from the selected data asset. The machine readable instructions configure the system to generate, based on the processed data, a first set of data assets for displaying at a first position relative to the selected data asset, the first set of data assets being one level upstream or downstream from the selected data asset, and a first data asset in the first set of data assets to be displayed at a selected position relative to the selected data asset. The machine readable instructions configure the system to generate, based on the processed data, a second set of data assets for displaying at a second position relative to the selected data asset, the second set of data assets being one level upstream or downstream from the first data asset. In response to a second data asset from the first set of data assets being selected, the machine readable instructions configure the system to reposition the second data asset for display at the selected position; and to replace, for display, the second set of data assets with a third set of data assets that are one level upstream or downstream from the second data asset.

In other features, the machine readable instructions further configure the system to capture, from the lineage data including a network of relationships of data assets, information about data assets that are upstream and downstream from the selected data asset, and information about relationship of the selected data asset to the data assets upstream and downstream from the selected data asset. The machine readable instructions further configure the system to generate, from the captured information, number of upstream and downstream relationships of the selected data asset. The machine readable instructions further configure the system to identify, based on the number of upstream and downstream relationships of the selected data asset, the information associated with lineage of the selected data asset, the information including the one or more data assets contributing to the second data asset.

In other features, in the first set of data assets the first data asset is used most to search a catalog of data assets upstream or downstream from the selected data asset; and remaining data assets are arranged in opposite directions from the first data asset in a decreasing order of use of the remaining data assets to search the catalog of data assets.

In other features, the selected data asset identifies the first set of data assets as being one level upstream or downstream from the selected data asset, the first data asset identifies the second set of data assets as being one level upstream or downstream from the first data asset, and the second data asset identifies the third set of data assets as being one level upstream or downstream from the second data asset.

In other features, the data associated with the lineage of the selected data asset includes data from one or more computer programs developed by one or more software vendors.

In other features, in response to access to a data asset in the one or more levels being restricted due to security, the machine readable instructions further configure the system to generate, for displaying, based on the processed data, an indication that access to the data asset is restricted due to security.

In other features, the machine readable instructions further configure the system to generate, for displaying, based on the processed data, a link between the selected data asset and one of the data assets at the one or more levels upstream or downstream from the selected data asset. The machine readable instructions further configure the system to generate, for displaying, based on the processed data, additional information about the lineage of the selected data asset in response to a cursor being positioned over the link.

In other features, the additional information includes identification of a computer program associated with transforming the data assets linked by the link.

In other features, the additional information includes a hyperlink for providing further information about the lineage of the selected data asset, and the machine readable instructions further configure the system to generate, for displaying, based on the processed data, the further information in response to the hyperlink being selected.

In still other features, a method executed by a data processing system for analyzing lineage data comprises processing, by the data processing system, data associated with lineage of a selected data asset, the processed data indicating relationship of the selected data asset with data assets upstream or downstream from the selected data asset. The method further comprises generating, by the data processing system, based on the processed data, a first set of data assets for displaying at a first position relative to the selected data asset, the first set of data assets being one level upstream or downstream from the selected data asset, and a first data asset in the first set of data assets to be displayed at a selected position relative to the selected data asset. The method further comprises generating, by the data processing system, based on the processed data, a second set of data assets for displaying at a second position relative to the selected data asset, the second set of data assets being one level upstream or downstream from the first data asset. The method further comprises, in response to a second data asset from the first set of data assets being selected, repositioning, by the data processing system, the second data asset for display at the selected position; and replacing, by the data processing system, for display, the second set of data assets with a third set of data assets that are one level upstream or downstream from the second data asset.

In other features, the method further comprises, capturing, by the data processing system, from the lineage data including a network of relationships of data assets, information about data assets that are upstream and downstream from the selected data asset, and information about relationship of the selected data asset to the data assets upstream and downstream from the selected data asset. The method further comprises, generating, by the data processing system, from the captured information, number of upstream and downstream relationships of the selected data asset. The method further comprises, identifying, by the data processing system, based on the number of upstream and downstream relationships of the selected data asset, the information associated with lineage of the selected data asset, the information including the one or more data assets contributing to the second data asset.

In other features, in the first set of data assets, the first data asset is used most to search a catalog of data assets upstream or downstream from the selected data asset, and the method further comprises arranging, by the data processing system, remaining data assets in the first set of data assets in opposite directions from the first data asset in a decreasing order of use of the remaining data assets to search the catalog of data assets.

In other features, the method further comprises identifying, by the data processing system, the first set of data assets as being one level upstream or downstream from the selected data asset; the second set of data assets as being one level upstream or downstream from the first data asset; and the third set of data assets as being one level upstream or downstream from the second data asset.

In other features, the method further comprises, in response to access to a data asset in the one or more levels being restricted due to security, generating, by the data processing system, for displaying, based on the processed data, an indication that access to the data asset is restricted due to security.

In other features, the method further comprises generating, for displaying, based on the processed data, by the data processing system, a link between the selected data asset and one of the data assets at the one or more levels upstream or downstream from the selected data asset. The method further comprises generating, for displaying, based on the processed data, by the data processing system, additional information about the lineage of the selected data asset in response to a cursor being positioned over the link.

In other features, the additional information includes identification of a computer program associated with transforming the data assets linked by the link.

In other features, the additional information includes a hyperlink for providing further information about the lineage of the selected data asset in response to the hyperlink being selected, and the method further comprises generating, for displaying, based on the processed data, by the data processing system, the further information in response to the hyperlink being selected.

In still other features, a system comprises a processor and machine readable instructions stored on a tangible machine readable medium. When executed by the processor, the machine readable instructions configure the system to generate, based on lineage data, information for displaying lineage of a first data asset, the information including one or more data assets contributing to the first data asset. The machine readable instructions configure the system to receive an input representing selection of a second data asset. The machine readable instructions configure the system to, in response to receiving the input, identify information associated with lineage of the second data asset; reposition the second data asset to a different position; and convey, for displaying, one or more data assets contributing to the second data asset.

In other features, the machine readable instructions further configure the system to reposition the second data asset by replacing the first data asset with the second data asset.

In other features, the machine readable instructions further configure the system to capture, from the lineage data including a network of relationships of data assets, information about data assets that are upstream and downstream from the second data asset, and information about relationship of the second data asset to the data assets upstream and downstream from the second data asset. The machine readable instructions further configure the system to generate, from the captured information, number of upstream and downstream relationships of the second data asset. The machine readable instructions further configure the system to identify, in response to receiving the input, based on the number of upstream and downstream relationships of the second data asset, the information associated with lineage of the second data asset, the information including the one or more data assets contributing to the second data asset.

In still other features, a system comprises a processor and machine readable instructions stored on a tangible machine readable medium. When executed by the processor, the machine readable instructions configure the system to process data associated with lineage of a selected data asset, the processed data indicating relationship of the selected data asset with data assets upstream or downstream from the selected data asset. The machine readable instructions configure the system to generate, for displaying, based on the processed data, summaries of the selected data asset and data assets at one or more levels upstream or downstream from the selected data asset, the summaries indicating selectable paths upstream or downstream from the selected data asset for searching the lineage of the selected data asset. A summary of a data asset includes an identifier of the data asset, a number of relationships of the data asset with data assets one level upstream, and a number of relationships of the data asset with data assets one level downstream from the data asset.

In other features, the machine readable instructions further configure the system to inspect information stored in a data asset catalog regarding data assets and instruments used to transform the data assets. The machine readable instructions further configure the system to capture information about data assets that are transformed by the instruments and information about the instruments that transformed the data assets. The machine readable instructions further configure the system to track, based on the captured information, relationships of data assets with other data assets and with the instruments used to transform the data assets. The machine readable instructions further configure the system to generate, based on the tracking, a network of relationships of data assets with other data assets and with the instruments used to transform the data assets. The machine readable instructions further configure the system to generate the summaries from the network of relationships.

In other features, the summaries of the selected data asset and the data assets at the one or more levels upstream or downstream from the selected data asset are generated for displaying a portion of the lineage of the selected data asset.

In other features, the machine readable instructions further configure the system to generate, based on the processed data, summaries of a first set of data assets for displaying at a first position relative to the summary of the selected data asset, the first set of data assets being at a selected level from the one or more levels; summary of a first data asset in the first set of data assets to be displayed at a selected position relative to the summary of the selected data asset, the first data asset being used most to search a catalog of data assets upstream or downstream from the selected data asset; and summaries of remaining data assets in the first set of data assets being arranged in opposite directions from the first data asset in a decreasing order of use of the remaining data assets to search the catalog of data assets.

In other features, the machine readable instructions further configure the system to generate, based on the processed data, for displaying at a first position relative to the summary of the selected data asset, summaries of a first set of data assets identified as being one level upstream or downstream in the summary of the selected data asset. The machine readable instructions further configure the system to generate, based on the processed data, for displaying at a selected position relative to the summary of the selected data asset, a summary of a first data asset in the first set of data assets. The machine readable instructions further configure the system to generate, based on the processed data, for displaying at a second position relative to the summaries of the first set of data assets, summaries of a second set of data assets identified as being one level upstream or downstream in the summary of the first data asset.

In other features, the machine readable instructions further configure the system to generate, based on the processed data, summaries of a first set of data assets for displaying at a first position relative to the summary of the selected data asset, a summary of a first data asset in the first set of data assets to be displayed at a selected position relative to the summary of the selected data asset. The machine readable instructions further configure the system to generate, based on the processed data, for displaying at a second position relative to the summaries of the first set of data assets, summaries of a second set of data assets identified as being one level upstream or downstream in the summary of the first data asset. The machine readable instructions further configure the system to, in response to a summary of a second data asset from the first set of data assets being selected, reposition the summary of the second data asset for display at the selected position; and replace, for display, the summaries of the second set of data assets with summaries of a third set of data assets identified as being one level upstream or downstream in the summary of the second data asset.

In other features, the machine readable instructions further configure the system to generate, for displaying, based on the processed data, summaries of data assets at an additional level upstream or downstream from the selected data asset by repositioning the summaries of data assets from the one or more levels.

In other features, the data associated with the lineage of the selected data asset includes data from one or more computer programs developed by one or more software vendors.

In other features, in response to access to a data asset in the one or more levels being restricted due to security, the machine readable instructions further configure the system to generate, for displaying, based on the processed data, a summary of the data asset, the summary of the data asset including an indication that access to the data asset is restricted due to security.

In other features, the machine readable instructions further configure the system to generate, for displaying, based on the processed data, a link between the summary of the selected data asset and a summary of one of the data assets at the one or more levels upstream or downstream from the selected data asset. The machine readable instructions further configure the system to generate, for displaying, based on the processed data, additional information about the lineage of the selected data asset in response to a cursor being positioned over the link.

In other features, the additional information includes identification of a computer program associated with transforming the data assets whose summaries are linked by the link.

In other features, the additional information includes a hyperlink for providing further information about the lineage of the selected data asset, and the machine readable instructions further configure the system to generate, for displaying, based on the processed data, the further information in response to the hyperlink being selected.

In still other features, a method executed by a data processing system for analyzing lineage data comprises processing, by the data processing system, data associated with lineage of a selected data asset, the processed data indicating relationship of the selected data asset with data assets upstream or downstream from the selected data asset. The method further comprises generating, by the data processing system, for displaying, based on the processed data, summaries of the selected data asset and data assets at one or more levels upstream or downstream from the selected data asset, the summaries indicating selectable paths upstream or downstream from the selected data asset for searching the lineage of the selected data asset. A summary of a data asset includes an identifier of the data asset, a number of relationships of the data asset with data assets one level upstream, and a number of relationships of the data asset with data assets one level downstream from the data asset.

In other features, the method further comprises inspecting information stored in a data asset catalog regarding data assets and instruments used to transform the data assets. The method further comprises capturing information about data assets that are transformed by the instruments and information about the instruments that transformed the data assets. The method further comprises tracking, based on the captured information, relationships of data assets with other data assets and with the instruments used to transform the data assets. The method further comprises generating, based on the tracking, a network of relationships of data assets with other data assets and with the instruments used to transform the data assets. The method further comprises generating, the summaries from the network of relationships.

In other features, the method further comprises generating, based on the processed data, summaries of a first set of data assets for displaying at a first position relative to the summary of the selected data asset, the first set of data assets being at a selected level from the one or more levels. The method further comprises a summary of a first data asset in the first set of data assets to be displayed at a selected position relative to the summary of the selected data asset, the first data asset being used most to search a catalog of data assets upstream or downstream from the selected data asset. The method further comprises summaries of remaining data assets in the first set of data assets being arranged in opposite directions from the first data asset in a decreasing order of use of the remaining data assets to search the catalog of data assets.

In other features, the method further comprises generating, based on the processed data, for displaying at a first position relative to the summary of the selected data asset, summaries of a first set of data assets identified as being one level upstream or downstream in the summary of the selected data asset. The method further comprises generating, based on the processed data, for displaying at a selected position relative to the summary of the selected data asset, a summary of a first data asset in the first set of data assets. The method further comprises generating, based on the processed data, for displaying at a second position relative to the summaries of the first set of data assets, summaries of a second set of data assets identified as being one level upstream or downstream in the summary of the first data asset.

In other features, the method further comprises generating, based on the processed data, summaries of a first set of data assets for displaying at a first position relative to the summary of the selected data asset, a summary of a first data asset in the first set of data assets to be displayed at a selected position relative to the summary of the selected data asset. The method further comprises generating, based on the processed data, for displaying at a second position relative to the summaries of the first set of data assets, summaries of a second set of data assets identified as being one level upstream or downstream in the summary of the first data asset. The method further comprises, in response to a summary of a second data asset from the first set of data assets being selected, repositioning the summary of the second data asset for display at the selected position; and replacing, for display, the summaries of the second set of data assets with summaries of a third set of data assets identified as being one level upstream or downstream in the summary of the second data asset.

In other features, the method further comprises generating, for displaying, by the data processing system, based on the processed data, summaries of data assets at an additional level upstream or downstream from the selected data asset by repositioning the summaries of data assets from the one or more levels.

In other features, the method further comprises generate, for displaying, based on the processed data, a link between the summary of the selected data asset and a summary of one of the data assets at the one or more levels upstream or downstream from the selected data asset. The method further comprises generate, for displaying, based on the processed data, additional information about the lineage of the selected data asset in response to a cursor being positioned over the link. The additional information includes identification of a computer program associated with transforming the data assets whose summaries are linked by the link, or the additional information includes a hyperlink for providing further information about the lineage of the selected data asset in response to the hyperlink being selected.

In still other features, a system for analyzing lineage data of a selected data asset comprises a processor and machine readable instructions stored on a tangible machine readable medium. When executed by the processor, the machine readable instructions configure the system to inspect information stored in a data asset catalog regarding data assets and instruments used to transform the data assets. The machine readable instructions configure the system to capture information about data assets that are transformed by the instruments and information about the instruments that transformed the data assets. The machine readable instructions configure the system to track, based on the captured information, relationships of data assets with other data assets and with the instruments used to transform the data assets. The machine readable instructions configure the system to generate, based on the tracking, a network of relationships of data assets with other data assets and with the instruments used to transform the data assets. The machine readable instructions configure the system to generate, for displaying, from the network of relationships, summaries of a selected data asset and data assets at one or more levels upstream or downstream from the selected data asset, the summaries indicating selectable paths upstream or downstream from the selected data asset for searching the lineage of the selected data asset. A summary of a data asset includes an identifier of the data asset and a number of relationships of the data asset with data assets one level upstream and a number of relationships of the data asset with data assets one level downstream from the data asset.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 2:
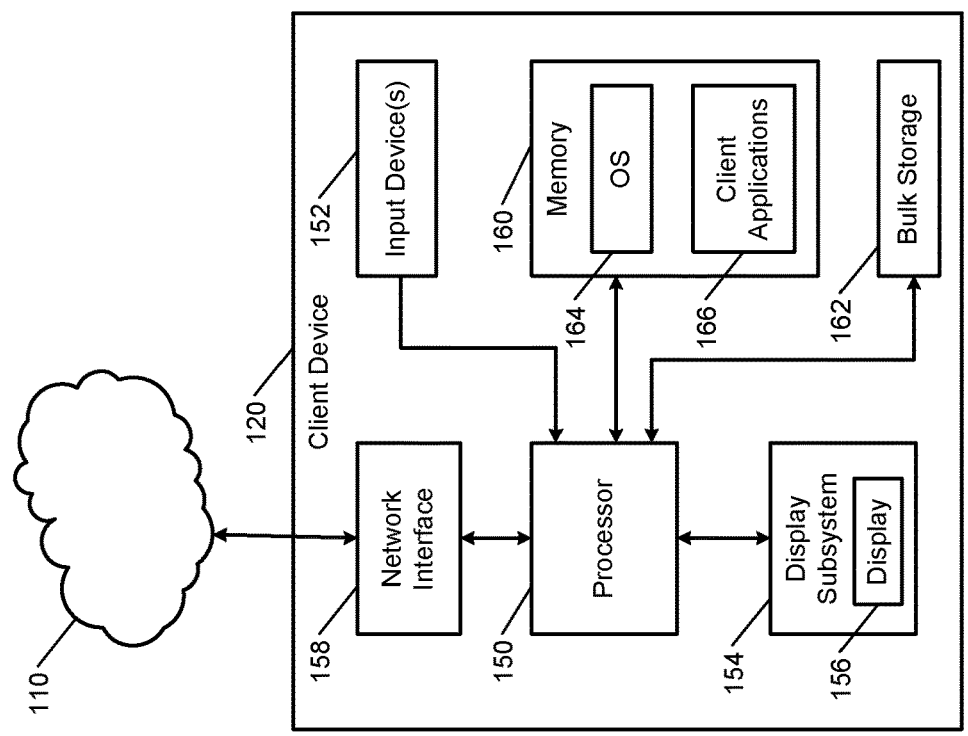
FIG. 2 is a functional block diagram of an example of the client device.

Data lineage can help answer many questions including, for example, the following: where is the data coming from; can I trust this dataset; where is the process creating this data; which other process is using this data; is this data used to generate any landmark reports in an enterprise; how is this data related to a known-good data source; how complex are relationships of a data asset (see definition below); can I view data assets upstream/downstream from this data asset; what transformations has this data assets been through; and so on. These and other questions concerning data lineage can be answered by providing systems and methods for rendering and analyzing data lineage. Traditional systems and methods provide large amounts of lineage information, specifically end-to-end lineage information, that is, provide the "complete view" of all data lineage connections, which can be overwhelming, incomprehensible, and difficult to navigate, search, retrieve, and analyze.

The present disclosure provides systems and methods for rendering partial data lineage for efficient search, retrieval, and evaluation of the data lineage. The system is both simple to view and easy to navigate since it focuses on displaying a limited amount of information (portions of lineage data at only a few hierarchical levels) and since it presents specific information (the number of upstream and downstream relationship as described below) that enables the viewer to select a path to search further levels of lineage. The system displays a limited number of upstream and downstream levels of lineage in a centered and carousal manner as explained below. The system allows users to focus on exploring lineage of a data asset a few levels upstream and downstream without viewing the complexity of all of the upstream and downstream relationships of the data asset. The system allows users to identify the impact of relationships of data assets on other data assets upstream/downstream by visualization and priority ordering from left to right of the displayed information. The system provides the ability to see a graphical view of lineage relationships of a data asset within limits. For extensive relationship graphs, the system supports the ability to scroll and search a set of data assets in the upstream/downstream views.

Specifically, the system according to the present disclosure displays summaries of relationships of a data asset of interest with other data assets at a limited number of levels of upstream and downstream from the data asset of interest. The summaries of the relationships are arranged in rows above and below the summary of the data asset of interest. For example, the system displays summaries of relationships up to parent and grandparent levels upstream and down to child and grandchild levels downstream. Displaying additional but limited number of levels (e.g., great-grandparent and great-grandchild levels) is contemplated. The system, however, may not show all the grandparent and grandchildren level relationships of the data asset of interest, which can make the visualization complex and cluttered. Instead, the user has a limited and focused view of the relationships of the data asset of interest with other data assets at a limited number of levels of upstream and downstream from the data asset of interest.

More specifically, the system provides a carousal feature to facilitate navigation through the lineage data and to select a path upstream or downstream to further search and investigate the lineage data. The system provides a summary of each data asset. The summary of a data asset identifies the data asset and indicates the number of upstream and downstream relationships of the data asset. In each row, data assets are arranged in order of usage. In each row, a data asset that is most used upstream and downstream of the data asset of interest is displayed directly above or below the data asset of interest (depending on whether the row includes data assets upstream or downstream from the data asset of interest). The user views grandparent-level data assets of a parent-level data asset that is directly above the data asset of interest. By selecting (clicking on) a new data asset in the parent row, the user can view grandparent-level data assets of the newly selected data asset. This is called a carousal feature since the data assets in a row are shifted left or right like a carousal when a new data asset in a row is selected. Similar functionality is provided downstream from the data asset of interest.

Additionally, the user can elect to view a plurality of upstream levels (e.g., 3 or 4 levels) arranged in respective rows displayed above the data asset of interest, which is displayed at the bottom of the display. Alternatively, the user can elect to view a plurality of downstream levels (e.g., 3 or 4 levels) arranged in respective rows displayed below the data asset of interest, which is displayed at the top of the display. This is done using a scroll and search feature. Further, the system can display data assets that are related to the data asset of interest and that are generated (transformed) by any number and type of applications regardless of the developer (vendor) of the applications. These and other features of the system are described below in detail.

As used herein, a data asset is a result of taking data generated by various applications throughout an enterprise and producing higher-quality-data end products to integrate and monitor the business of the enterprise. In other words, a data asset is a data of high value to an enterprise. For example, various applications within an enterprise may produce data related to filling customer orders for the products or services the enterprise provides or data related to managing financial transactions of the enterprise. From this raw data, higher-quality data called data assets may be produced to present to end users for reporting or supporting decision making (e.g., financial dashboard). To produce data assets, raw data from various applications is typically cleansed to enable users to better understand the progress of the enterprise and to evaluate cause-and-effect relationships in the data. Data assets can be searched and their lineage can be analyzed using the system of the present disclosure.

Throughout the present disclosure, the data assets are shown and described as being arranged in rows along a horizontal plane or a horizontal axis for illustrative purposes only. Instead, the entire layout of the data assets shown and described throughout the present disclosure can be rotated by ninety degrees, where the data assets can be arranged in columns instead of rows along a vertical plane or a vertical axis. Therefore, terms such as rows, left, right, above, and below used throughout the present disclosure are merely illustrative in nature and do not limit the scope of the disclosure. For example, if the data assets are arranged vertically instead of horizontally, the above terms will change to columns, up, down, to the left, to the right, and so on.

Below are simplistic examples of a distributed computing environment in which the systems and methods of the present disclosure can be implemented. Throughout the description, references to terms such as servers, client devices, applications and so on are for illustrative purposes only. The terms servers and client devices are to be understood broadly as representing computing devices comprising one or more processors and memory configured to execute machine readable instructions. The terms applications and computer programs are to be understood broadly as representing machine readable instructions executable by the computing devices.

Figure 1:
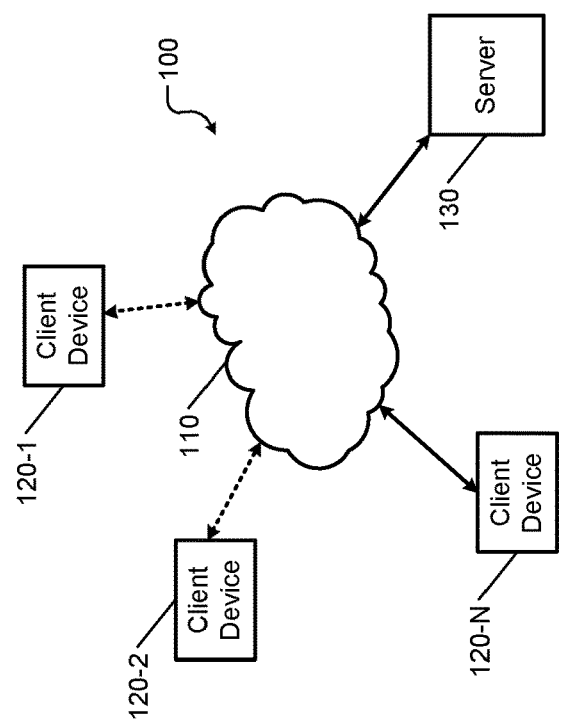
FIG. 1 is a functional block diagram of an example of a distributed network system including a network, multiple client devices, and a server providing services to the client devices via the network.

FIG. 1 shows a simplified example of a distributed network system 100 of an enterprise. The distributed network system 100 includes a network 110, one or more client devices 120-1, 120-2, . . . , and 120-N (collectively client devices 120) (where N is an integer greater than or equal to one), and a server 130. The network 110 may include a local area network (LAN), a wide area network (WAN) such as the Internet, or other type of network (collectively shown as the network 110). While only one server is shown, the distributed network system 100 may include multiple servers. For example, the servers may be located at different departments and different geographical locations of the enterprise. The client devices 120 communicate with the server 130 via the network 110. The client devices 120 and the server 130 may connect to the network 110 using wireless and/or wired connections to the network 110.

For example, the client devices 120 may include smartphones, personal digital assistants (PDAs), laptop computers, personal computers (PCs), and so on. The server 130 may provide multiple services to the client devices 120. For example, the server 130 may execute a plurality of software applications developed by one or more vendors. The server 130 may host multiple databases that are utilized by the plurality of software applications and that are used by users of the client devices 120.

In addition, the server 130 executes an application that collects and processes lineage data and that renders partial data lineage for efficient search, retrieval, and evaluation of the data lineage. This application is hereinafter called the lineage application (or a lineage program or a lineage data processing system). The lineage application accesses data from the plurality of software applications (regardless of developers) and the databases. The lineage application processes the data and associated metadata to generate lineage information for a data asset of interest (also called primary data asset). For example, the lineage application processes the source/destination data assets for a primary data asset and additional metadata including the following: the person who created the data asset (validator), the source from which the relationship is being gathered (e.g., SQL server integration services (SSIS) package, SQL Script), the application ID from which the relationship was created (e.g., portal, API, a name of a tool which a customer writes), annotation (s) entered by users during data transformations, and historical information regarding the data asset (e.g., date last run and history of runs available from the SSIS package). By processing the information, the lineage application can provide lineage information for the data asset of interest.

The lineage application displays limited portions of the lineage data at a time to the users of the client devices 120 to view the lineage data in an easy and comprehensible manner as explained below in detail. The displayed limited information is not merely a zoomed-in, quantitatively reduced portion of a larger end-to-end display of the entire lineage of a data asset. Instead, the displayed limited information provides qualitatively specific information (summaries and link information, transformation information (e.g., which application transformed the data asset), and the ability to view the source-destination (end-to-end) data flow explained below) about the lineage at only a few hierarchical levels. The displayed limited information empowers the viewer to intelligently select a path along the lineage and to further search, retrieve, and analyze a next portion of the lineage data of the data asset in a focused manner as described below in detail.

The users of the client devices 120 can access the lineage application on the server 130 via the network 110. The users of the client devices 120 can search for the lineage data of a data asset of interest using the lineage application. The users of the client devices 120 can view the lineage of the data asset of interest using the lineage application as explained in detail below.

FIG. 2 shows a simplified example of the client device 120. The client device 120 may typically include a central processing unit (CPU) or processor 150, one or more input devices 152 (e.g., a keypad, touchpad, mouse, and so on), a display subsystem 154 including a display 156, a network interface 158, a memory 160, and a bulk storage 162.

The network interface 158 connects the client device 120 to the distributed network system 100 via the network 110. For example, the network interface 158 may include a wired interface (e.g., an Ethernet interface) and/or a wireless interface (e.g., a Wi-Fi, Bluetooth, near field communication (NFC), or other wireless interface). The memory 160 may include volatile or nonvolatile memory, cache, or other type of memory. The bulk storage 162 may include flash memory, a hard disk drive (HDD), or other bulk storage device.

The processor 150 of the client device 120 executes an operating system (OS) 164 and one or more client applications 166. The client applications 166 include an application to connect the client device 120 to the server 130 via the network 110. The client device 120 accesses the lineage application executed by the server 130 via the network 110. The lineage application executed by the server 130 renders portions of the lineage data on the display 156 of the client device 120.

Figure 3:
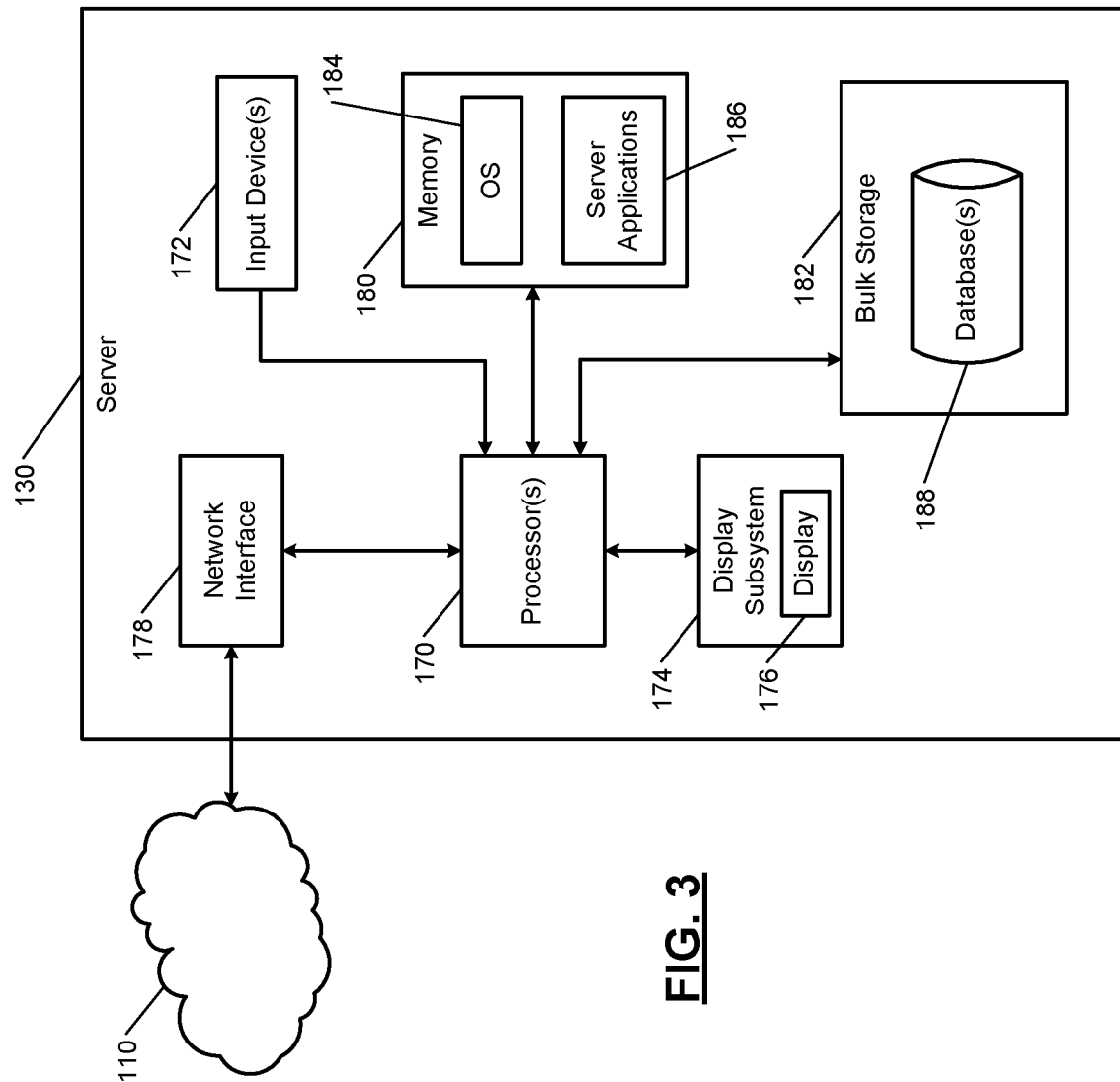
FIG. 3 is a functional block diagram of an example of the server.

FIG. 3 shows a simplified example of the server 130. The server 130 typically includes one or more CPUs or processors 170, one or more input devices 172 (e.g., a keypad, touchpad, mouse, and so on), a display subsystem 174 including a display 176, a network interface 178, a memory 180, and a bulk storage 182.

The network interface 178 connects the server 130 to the distributed network system 100 via the network 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more hard disk drives (HDDs), or other bulk storage device.

The processor 170 of the server 130 executes an operating system (OS) 184 and one or more server applications 186, which include the plurality of software applications (from multiple developers) and the lineage application. The lineage application executed by the server 130 renders portions of the lineage data on one or more client devices 120 via the network 110. The lineage application can also render portions of the lineage data on the display 176 of the server 130. The bulk storage 182 may store one or more databases 188 that store data structures used by the server applications 186 to perform respective functions.

Figure 4:
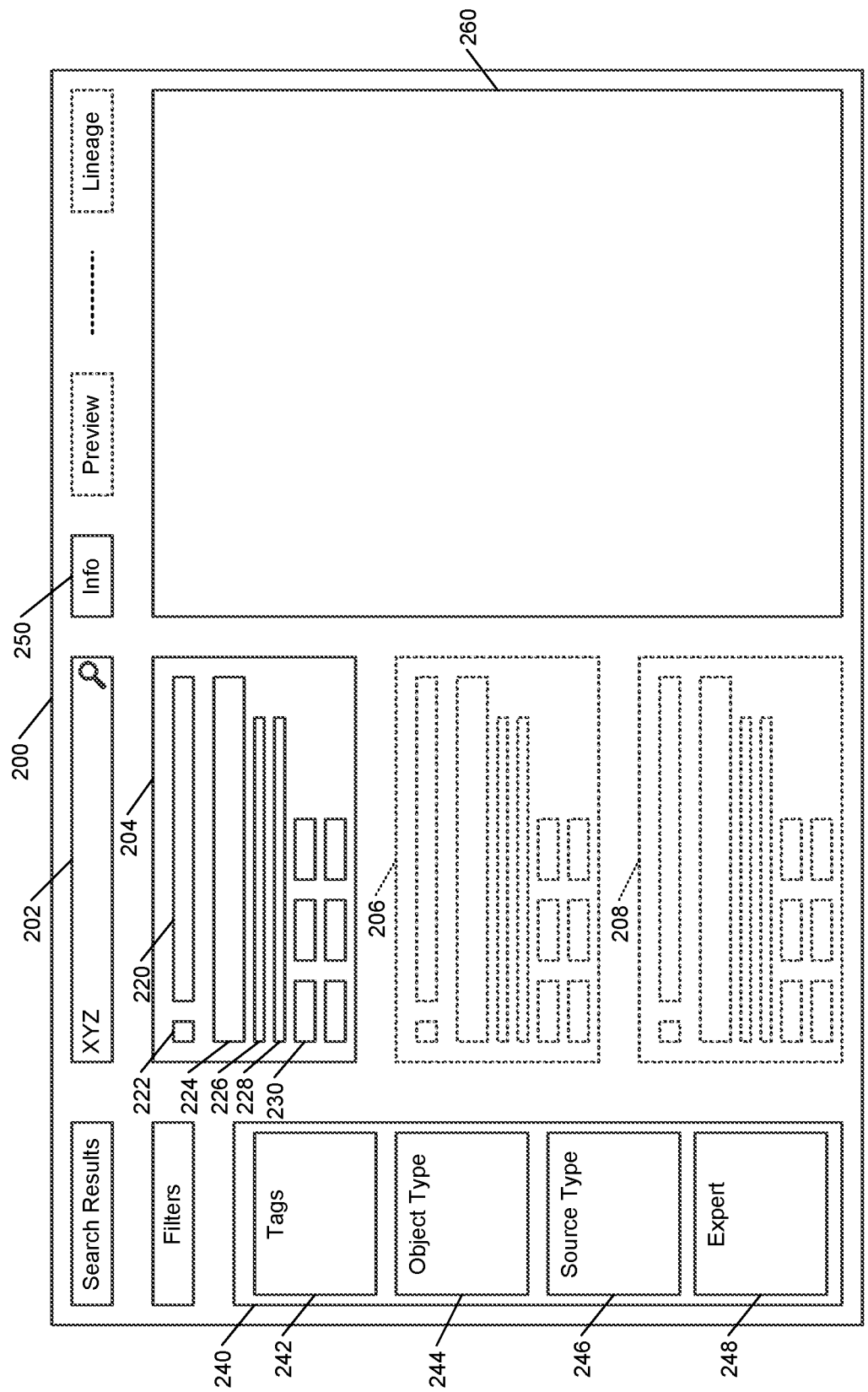
FIGS. 4-6C illustrate an example of a lineage data processing system according to the present disclosure.

FIGS. 4-6C show an example of the lineage application according to the present disclosure. FIG. 4 shows an example of an image 200 produced by the lineage application on a display of a device (e.g., the display 156 the client device 120 or the display 176 of the server 130). In FIG. 4, the image 200 shows examples of search results when a user searches a data asset of interest (e.g., XYZ) by typing a query in a search bar 202. For example, the search results are shown at 204, 206, and 208. For example, at 204, a search result includes an indication of a file object type 220 and a corresponding icon or symbol 222 for the data asset of interest (also called the primary data asset). At 224, the name of the primary data asset (e.g., XYZ) is shown. At 226, names of experts or responsible persons associated with the primary data asset are shown (e.g., John Smith and 3 others). At 228, location information of the primary data asset is shown. At 230, tags associated with the primary data asset are shown (e.g., analytics, insights, customer churn, and so on), which facilitate locating data assets when the data assets are searched. Additional or less information of the primary data asset may be shown. The contents of other search results 206, 208, and so on may be similar.

At 240, various filters can be selected by the user to refine the search results. For example, the filters 240 may include tags 242 (e.g., human resources, finance, health, sales, and so on), object type 244, source type 246 (e.g., SQL server, SQL server Tabular, SQL server analysis services, and so on), and expert 248 (e.g., abc@company.com, def@company.com, and so on). One or more of these filters can be selected to further narrow the search.

If the search result 204 for the primary data asset XYZ is selected and if a button "Info" (or "Properties") 250 is selected (clicked), a detailed information of the selected search result for the primary data asset XYZ is displayed in an image 260. For example, the detailed information displayed in the image 260 may include the following: the name of the primary data asset (XYZ), an alternate name for the primary data asset, a brief description of the primary data asset, experts associated with the primary data asset, tags associated with the primary data asset, and connection information (e.g., a server name, a database name, a schema name, an object name, and so on) for the primary data asset. The detailed information may also include additional information about by whom and when was the primary data asset last updated and registered.

Figure 5:
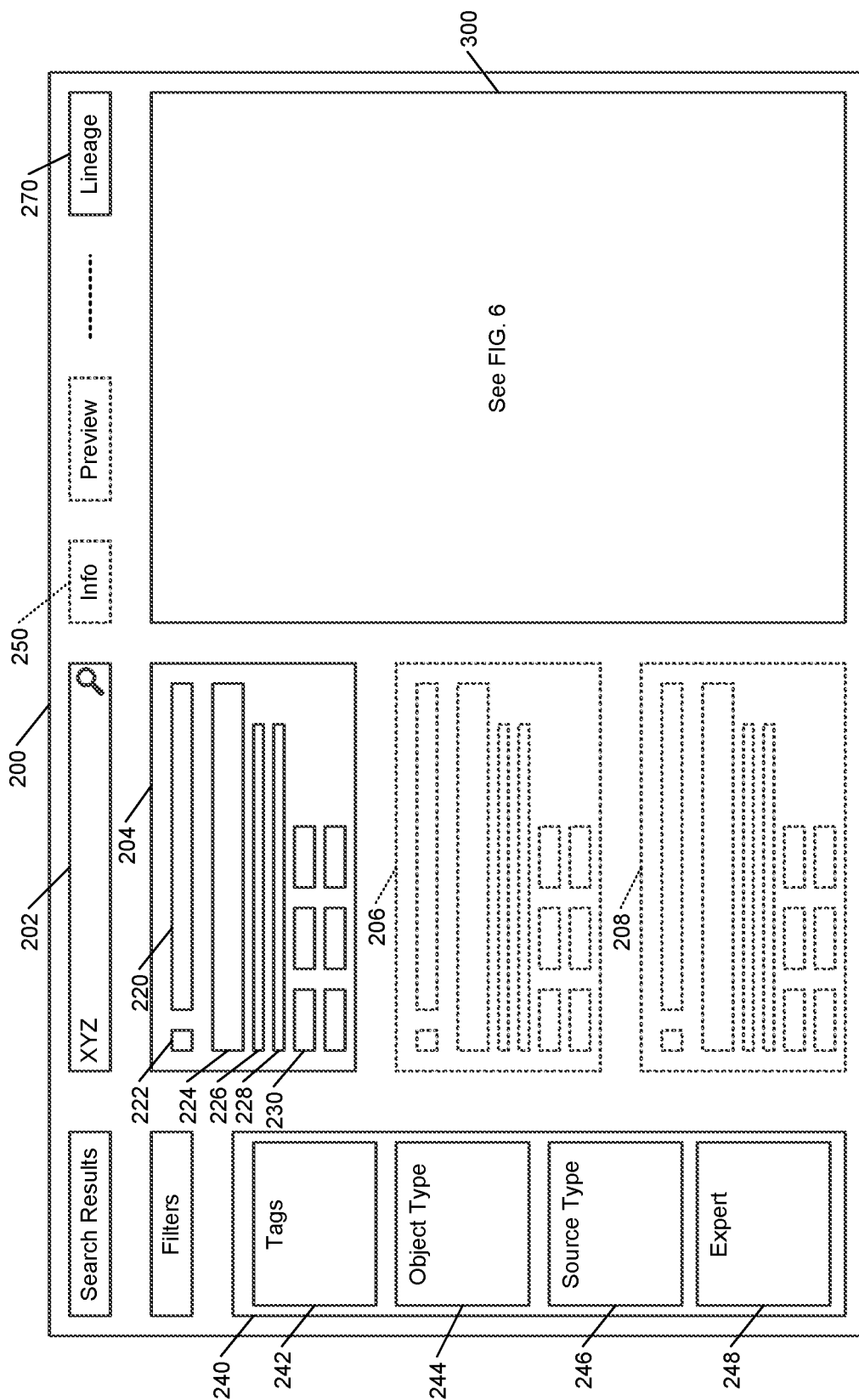
Figure 6A:
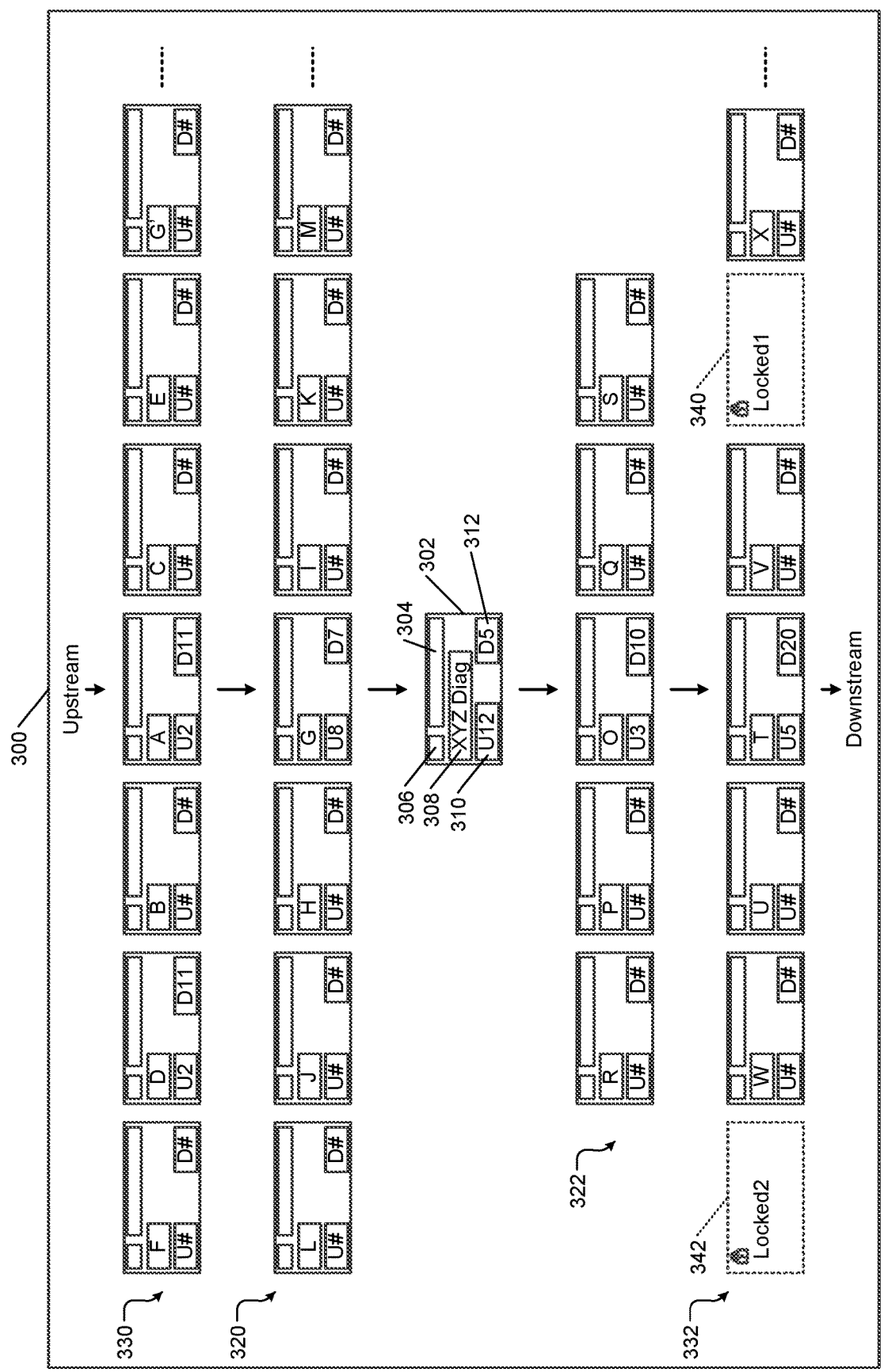
Figure 6B:
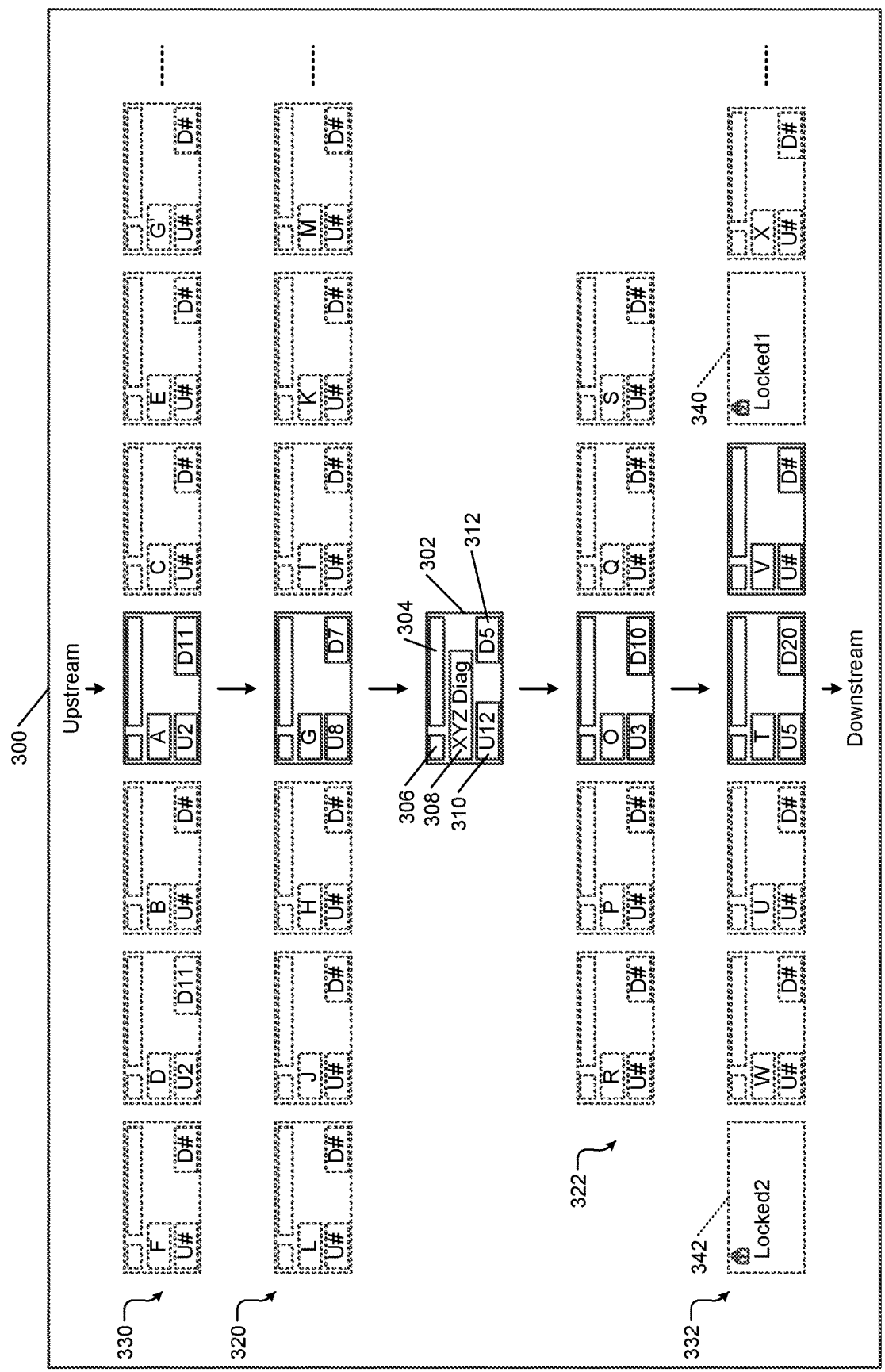
Figure 6C:
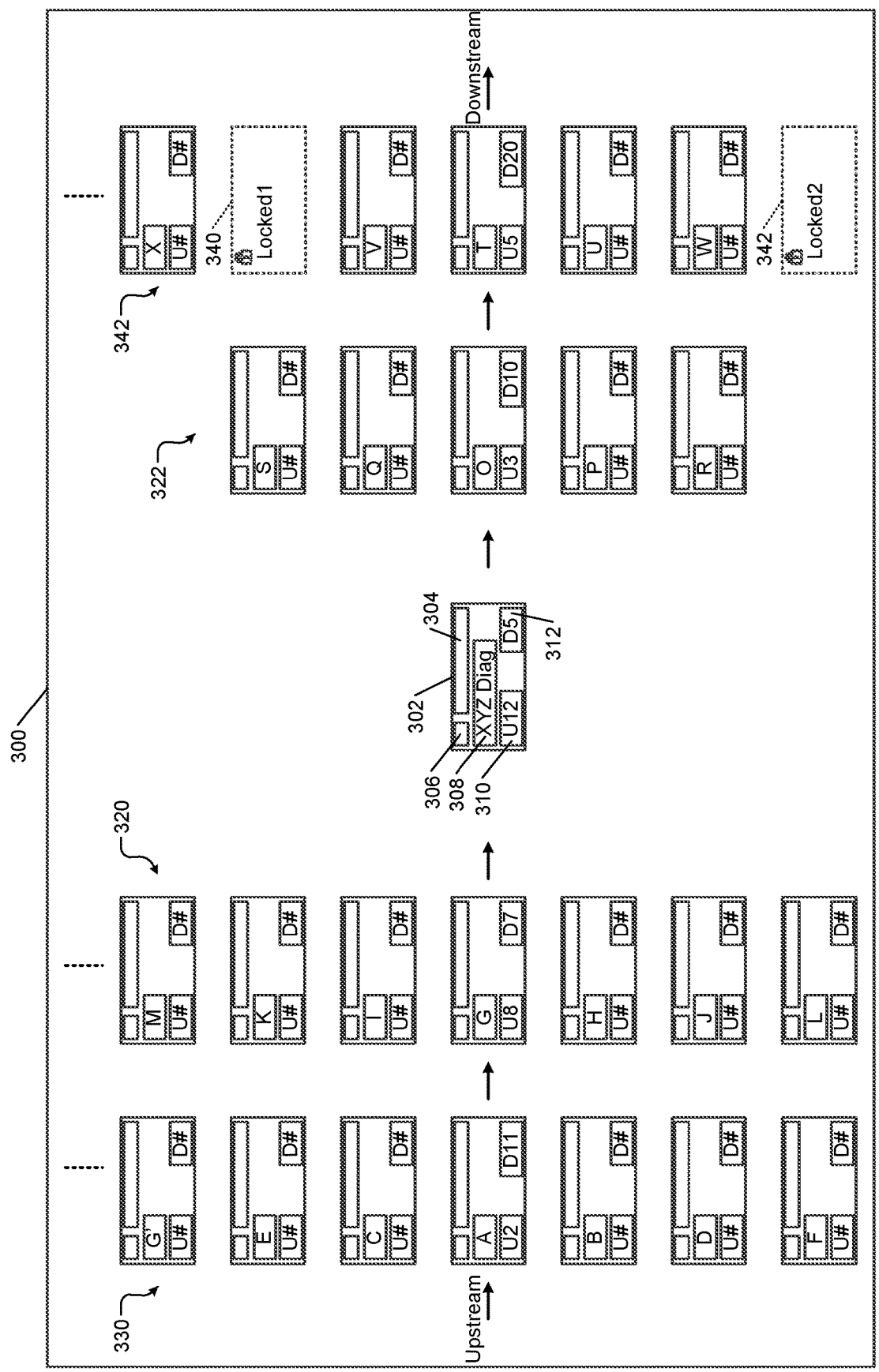

In FIG. 5, if the search result 204 for the primary data asset XYZ is selected and if a button "Lineage" 270 is selected (clicked), an image 300 is displayed according to the present disclosure for viewing and further searching/analyzing the lineage data of the primary data asset XYZ. FIGS. 6A-6C show the image 300 in detail. In the following discussion, the terms data assets and summaries of data assets are used interchangeably. Although references are made to showing or displaying data assets, what is meant is showing or displaying their summaries as described below.

In FIG. 6A, the image 300 displays the following. A summary 302 of the primary data asset XYZ is shown in the center (i.e., in a focal region or area of a display). The summary 302 includes identifying information of the primary data asset. For example, the identifying information may include an object type 304 (e.g., Table-SQL server), a corresponding icon or symbol 306, and a name 308 (XYZ) of the primary data asset. Additionally, the summary 302 includes a number of upstream and downstream relationships of the primary data asset. For example, the primary data asset may have relationships with 12 other data assets one level upstream (i.e., 12 other data assets one level upstream from the primary data asset were responsible for contributing to the primary data asset), which may be indicated as U12 (U for upstream) at 310. Further, the primary data asset may have relationships with five other data assets one level downstream (i.e., the primary data asset was responsible for contributing to five other data assets one level downstream from the primary data asset), which may be indicated as D5 (D for downstream) at 312.

Further, the levels can be defined as follows. In general, a level denotes a position of a data asset relative to one or more data assets in the lineage data or within the hierarchy of the lineage data. One level or a first level upstream from a particular data asset is a level that includes a first data asset (called a parent data asset in a parent level) responsible for contributing to the particular data asset without any contribution from any intervening data asset between the first data asset and the particular data asset. Two levels or a second level upstream from a particular data asset is a level that is one level upstream from the first level and that includes a second data asset (called a grandparent data asset in a grandparent level) responsible for contributing to the first data asset in the first level without any contribution from any intervening data asset between the second data asset and the first data asset, where the first data asset is responsible for contributing to the particular data asset without any contribution from any intervening data asset between the first data asset and the particular data asset; and so on.

Similarly, one level or a first level downstream from a particular data asset is a level that includes a first data asset (called a child data asset in a child level) to which the particular data asset contributed without any contribution from any intervening data asset between the particular data asset and the first data asset. Two levels or a second level downstream from a particular data asset is a level that is one level downstream from the first level and that includes a second data asset (called a grandchild data asset in a grandchild level) to which the first data asset in the first level contributed without any contribution from any intervening data asset between the first data asset and the second data asset, where the particular data asset contributed to the first data asset in the first level without any contribution from any intervening data asset between the particular data asset and the first data asset; and so on.

The following description explains how the number of upstream and downstream relationships of a data asset (shown in the summary as Uxx and Dyy) are determined. The number of upstream and downstream relationships of a data asset (shown in the summary as Uxx and Dyy) are determined as follows.

There are many ways in which data assets can be registered in a data asset catalog. Before describing the many ways in which data assets can be registered in a data asset catalog, a data asset catalog is defined as having certain basic characteristics including the following: First, a data asset catalog is a store of data asset references (i.e., either the asset themselves, or links to the actual locations of the data assets. Second, a data asset catalog stores one or more metadata about a data asset including name, friendly name, description, tags, owners, stakeholders, experts, and so on. Third, a data asset catalog contextually displays additional related information such as schema, data profile, data lineage, and so on. Further, the teachings of the present disclosure are not limited to a data asset catalog. Data lineage (as designed by the patent) could be added to any data asset storage service/product (e.g., Databases, Datawarehouses, Binary Large OBject (BLOB) stores, filestores, Not only SQL (NoSQL) databases, documentDBs, and so on) in addition to a data asset catalog.

The many ways in which data assets can be registered in a data asset catalog may include the following. For example, users may manually create the data assets in a data asset catalog (manual entry). Users may point to the data assets and select the data assets for registration (a registration tool captures the schema/profile etc.). Users can write scripts using an API. A crawler job can find data assets and register the data assets automatically.

For example, users may register data assets in a data asset catalog. The users may also register instruments of transformation such as queries and other artifacts that transform data assets. The lineage program (i.e., the systems and methods according to the present disclosure) inspects the transformation packages and collects information about the data assets that the transformation packages in fact transformed. The lineage program captures the transformation information (e.g., the tool of the transformation—a query). Some instruments of transformation have a design phase and a runtime phase. In the design phase, the user can specify that one data asset will be transformed into another (schema level information). When the instrument is deployed, actual transformations occur during runtime. The lineage program captures the information about the transformations that occur during the design and runtime phases from the transformation packages.

The lineage program may also employ a tool (e.g., an API) that can track the relationships of a data asset with other data assets and with transformation packages. Accordingly, when a package transforms a data asset, the information about the relationship of the data asset with the package and/or other data assets may be automatically tracked. Alternatively or additionally, the user can explicitly register a data asset that was used with a particular package as explained above.

Thus, a web or network of relationships of a data asset with other data assets and with transformation packages that transform the data asset is built in the data asset catalog by registering and/or tracking the transformation information (for both Microsoft and third party packages). The lineage program learns about the network of relationships of data assets and the network of data assets with which any given data asset is related from the data uploaded in the data asset catalog. The number of upstream and downstream relationships of a data asset shown in the summary of a data asset as Uxx and Dyy is derived from the data uploaded within the data asset catalog indicating a web or network of relationships of a data asset with other data assets and the transformations of that data asset.

Summaries of some or all of the data assets identified in the summary of the primary data asset may be displayed in respective rows above and below the primary data asset. For example, based on the size of the display, to fit in the image 300, summaries of seven of the 12 data assets upstream are shown in a row 320 above the summary 302 of the primary data asset. Further, summaries of all of the five data assets downstream are shown in a row 322 below the summary 302 of the primary data asset. These are only examples, and any number of data assets may be displayed. Further, existence of additional data assets that are not displayed may be indicated by displaying a partial summary or ellipses on one or both sides of a row as explained below in further detail.

For example, in the row 320, the seven data assets are named G, H, I, J, K, L, and M. The summaries of these data assets appear structurally and functionally similar to the summary 302 of the primary data asset. Therefore, separate reference numerals are not used to identify the elements of the summaries of these data assets. These data assets will be addressed by their names instead of reference numerals. In these summaries, the symbol "#" in the notations U# and D# denotes a nonnegative integer.

The summaries of the data assets in the row 320 are arranged as follows. The data asset that has the most usage, that is, the most used/viewed asset in a data catalog of data assets (e.g., Microsoft's Azure Data Catalog) from the data assets searched by users of the lineage application upstream from the primary data asset is listed directly above the primary data asset. This way, if a data asset upstream from the primary data asset is popular (i.e., most used/viewed) because other users have used it or referred to it, then that data asset is automatically displayed directly above the primary data asset. Accordingly, as used herein, the usage of a data asset indicates a degree to which, or the frequency with which, the data asset has been used or referred to by users of the lineage application upstream and/or downstream from the primary data asset. For example, among the 12 upstream data assets identified in the summary 302 of the primary data asset, the data asset G is the most used data asset in the data catalog of data assets used by the lineage application upstream from the primary data asset and is therefore positioned directly above the primary data asset.

The remaining data assets in the row 320 are arranged to the left and right of the data asset G in decreasing order of their usage as follows. For example, the data assets G, H, I, J, K, L, and M are sorted by their order of use (usage) in the data catalog used by the lineage application. Suppose that the ordered list of the data assets is G, H, I, J, K, L, and M, with G being the most used data asset, and M being the least used data asset in the data catalog used by the lineage application. In the ordered list, the data asset G being the most used data asset in the data catalog is positioned in the middle and directly above the primary data asset. The data asset H is the second most used data asset in the data catalog (i.e., less used than the data asset G) and is therefore positioned to the left of the data asset G. The data asset I is the third most used data asset in the data catalog (i.e., less used than the data asset H) and is therefore positioned to the right of the data asset G. The data asset J is the fourth most used data asset (i.e., less used than the data asset I) and is therefore positioned to the left of the data asset H. The data asset K is the fifth most used data asset in the data catalog (i.e., less used than the data asset J) and is therefore positioned to the right of the data asset I; and so on.

The ellipses ( . . . ) to the right of the data asset M indicate that there are more data assets connected to the primary data asset with less usage than the data asset M, which are laid out sequentially to the right of the data asset M, and which will be revealed (displayed or become visible) if the user clicks on the ellipses to the right of the data asset M. Throughout the present disclosure, while ellipses are used to indicate presence of additional non-displayed data assets, instead of ellipses, a partial summary of a data asset (e.g., a portion of a rectangle, similar to element 302, representing a partial summary of a data asset) may be displayed. This left to right ordering is displayed only on the first page of the lineage diagram to optimize the user's time and effort in searching and analyzing the lineage data of the primary data asset. Further, while the data assets actually displayed are arranged in the left, right, left, right manner described above, the remaining data assets that are not displayed are arranged from left to right simply in their decreasing order of usage and are hidden to the right of the last data asset on the right side of the row.

In the row 322, the five data assets are named O, P, Q, R, and S. The summaries of these data assets appear structurally and functionally similar to the summary 302 of the primary data asset. Therefore, separate reference numerals are not used to identify the elements of the summaries of these data assets. These data assets will be addressed by their names instead of reference numerals. In these summaries, the symbol "#" in the notations U# and D# denotes a nonnegative integer.

The summaries of the data assets in the row 322 are arranged as follows. The data asset that has the most usage that is, the most used/viewed asset in the data catalog from the data assets searched by users of the lineage application downstream from the primary data asset is listed directly below the primary data asset. For example, among the seven downstream data assets identified in the summary 302 of the primary data asset, the data asset O is the most used data asset in the data catalog used by the lineage application downstream from the primary data asset and is therefore positioned directly below the primary data asset.

The remaining data assets in the row 322 are arranged to the left and right of the data asset O in decreasing order of their usage as follows. For example, the data assets O, P, Q, R, and S are sorted by their order of use (usage) in the data catalog used by the lineage application. Suppose that the ordered list of the data assets is O, P, Q, R, and S, with O being the most used data asset, and S being the least used data asset in the data catalog used by the lineage application. In the ordered list, the data asset O being the most used data asset in the data catalog is positioned in the middle and directly below the primary data asset. The data asset P is the second most used data asset in the data catalog (i.e., less used than the data asset O) and is therefore positioned to the left of the data asset O. The data asset Q is the third most used data asset in the data catalog (i.e., less used than the data asset P) and is therefore positioned to the right of the data asset O. The data asset R is the fourth most used data asset (i.e., less used than the data asset Q) and is therefore positioned to the left of the data asset P. The data asset S is the fifth most used data asset in the data catalog (i.e., less used than the data asset R) and is therefore positioned to the right of the data asset Q. This left to right ordering is displayed only on the first page of the lineage diagram to optimize the user's time and effort in searching and analyzing the lineage data of the primary data asset.

In the row 320, the summary of the data asset G positioned directly above the primary data asset shows the number of upstream and downstream relationships of the data asset G respectively as U8 and D7. Since the data asset G is currently positioned directly above the primary data asset, only the upstream data assets to which the data asset G is related are shown in a row 330 above the row 320. In other words, if the data asset G is considered a parent of the primary data asset, only the parents of the data asset G (i.e., the upstream data assets of the data asset G or the grandparents of the primary data asset through the parent data asset G) are shown in the row 330. Since none of the other parent data assets H, I, J, K, L, and M of the primary data asset in the row 320 is positioned directly above the primary data asset, the parents of none of the other parent data assets H, I, J, K, L, and M are displayed. Further, while the summary of the data asset G shows that the data asset G has seven downstream relationships, only one of the seven downstream relationships of the data asset G (i.e., with the primary data asset) is shown.

This limited and focused display allows the user to have a focused view of a limited portion of the lineage data of the primary data asset since the view is not cluttered with the entire end-to-end lineage data of the primary data asset. This focused view enables the user to quickly analyze the displayed limited lineage data of the primary data asset and decide based on the information contained in the displayed summaries which path to select in the lineage of the primary data asset to further search, retrieve, and analyze additional lineage data of the primary data asset.

In the row 330, summaries of five of the eight data assets upstream to the data asset G are shown. The five data assets are named A, B, C, D, and E. The summaries of these data assets appear structurally and functionally similar to the summary 302 of the primary data asset. Therefore, separate reference numerals are not used to identify the elements of the summaries of these data assets. These data assets will be addressed by their names instead of reference numerals. In these summaries, the symbol "#" in the notations U# and D# denotes a nonnegative integer.

The summaries of the data assets in the row 330 are arranged as follows. Suppose that the eight grandparent data assets in the row 330 are ordered as A, B, C, D, E, F, G', and H' in the decreasing order of their usage. The data asset A that has the most usage is listed directly above the data asset G. The remaining data assets in the row 330 are arranged to the left and right of the data asset A in decreasing order of their usage as explained above with reference to data assets in the rows 320 and 322, with the most used data asset A positioned in the center and directly above the data asset G and the lesser used data assets arranged to the left and right of the data asset A in the following order: F, D, B, A, C, E, G', . . . .

The ellipses to the right of the data asset G' indicate that there are more data assets connected to the data asset G' (in row 330) with less usage than the data asset G', which are laid out sequentially in decreasing order of their usage to the right of the data asset G' in the row 330, and which will be revealed (displayed or become visible) if the user clicks on the ellipses to the right of the data asset G'. This left to right ordering is displayed only on the first page of the lineage diagram to optimize the user's time and effort in searching and analyzing the lineage data of the primary data asset. While the summary of the data asset A indicates that the data asset A is related to two upstream data assets and 11 downstream data assets, none of the two upstream data assets is currently shown (although may be shown as explained below), and only one of the 11 downstream data assets (the data asset G) is shown.

In the row 322, the summary of the data asset O positioned directly below the primary data asset shows the number of upstream and downstream relationships of the data asset O respectively as U3 and D10. Since the data asset O is currently positioned directly below the primary data asset, only the downstream data assets to which the data asset O is related are shown in a row 332 below the row 322. In other words, if the data asset O is considered a child of the primary data asset, only the children of the data asset O (i.e., the downstream data assets of the data asset O or the grandchildren of the primary data asset through the child data asset O) are shown in the row 332. Since none of the other children data assets P, Q, R, and S of the primary data asset in the row 322 is positioned directly below the primary data asset, the children of none of the other children data assets P, Q, R, and S are displayed. Further, while the summary of the data asset O shows that the data asset O has three upstream relationships, only one of the three upstream relationships of the data asset O (i.e., with the primary data asset) is shown.

In the row 332, summaries of five of the 10 data assets downstream to the data asset O are shown. The five data assets are named T, U, V, W, and X. The summaries of these data assets appear structurally and functionally similar to the summary 302 of the primary data asset. Therefore, separate reference numerals are not used to identify the elements of the summaries of these data assets. These data assets will be addressed by their names instead of reference numerals. In these summaries, the symbol "#" in the notations U# and D# denotes a nonnegative integer.

The summaries of the data assets in the row 332 are arranged as follows. Suppose that the 10 grandchildren in the row 332 are ordered as T, U, V, W, Locked1, Locked2, X, Y, Z, and Locked 3 (the locked data assets are explained below) in the decreasing order of their usage. The data asset T that has the most usage is listed directly below the data asset O. The remaining data assets in the row 332 are arranged to the left and right of the data asset T in decreasing order of their usage as explained above with reference to data assets in the rows 320, 322, and 330, with the most used data asset T positioned in the center and directly below the data asset O, and the lesser used data assets arranged to the left and right of the data asset T in the following order: Locked2, W, U, T, V, Locked1, and X, . . . .

The ellipses to the right of the data asset X indicate that there are more data assets connected to the data asset O with less usage than the data asset X, which are laid out sequentially in decreasing order of their usage to the right of the data asset X, and which will be revealed (displayed or become visible) if the user clicks on the ellipses to the right of the data asset X. This left to right ordering is displayed only on the first page of the lineage diagram to optimize the user's time and effort in searching and analyzing the lineage data of the primary data asset. While the summary of the data asset T indicates that the data asset T is related to five upstream data assets and 20 downstream data assets, none of the 20 downstream data assets is currently shown (although may be shown as explained below), and only one of the five upstream data assets (the data asset O) is shown.

This limited and focused display allows the user to have a focused view of a limited portion of the lineage data of the primary data asset since the view is not cluttered with the entire end-to-end lineage data of the primary data asset. This focused view enables the user to quickly analyze the displayed limited lineage data of the primary data asset and decide based on the information contained in the displayed summaries which path to select in the lineage of the primary data asset to further search, retrieve, and analyze additional lineage data of the primary data asset.

Further, two of the 10 downstream data assets mentioned in the summary of the data asset O, shown as data assets Locked1 340 and Locked2 342 in the row 332, are inaccessible based on security settings. No summary details are shown for these locked data assets Locked1 340 and Locked2 342. Instead, the only information shown for these locked data assets Locked1 340 and Locked2 342 is their locked state (e.g., shown as Locked1 and Locked2). If a viewer determines that there is some error associated with the primary data asset and that the error is not attributable to any data assets other than the locked data assets Locked1 340 and Locked2 342, the viewer can ascertain that the error may be attributable to the locked data assets Locked1 340 and/or Locked2 342. In other words, although the locked data assets Locked1 340 and Locked2 342 are inaccessible, the viewer can isolate the error to the locked data assets Locked1 340 and/or Locked2 342.

FIG. 6B shows that in some implementations, only the primary data asset and the data assets that are aligned vertically with the primary data asset in each row may be emphasized (highlighted or shown at a first intensity or in a first color). All other data assets in each row may be shown de-emphasized (faded or shown at a lower intensity than the first intensity or in a second color). The fading may be gradual instead of being of the same lower intensity or of the same second color. Different color schemes may be used instead of or in addition to fading to contrast the primary data asset and the data assets that are aligned vertically with the primary data asset from the rest of the data assets in each row.

FIG. 6C shows that in some implementations, the data assets may be may be arranged in a vertical layout instead of in a horizontal layout, where the data assets can be arranged in columns instead of rows along a vertical plane or a vertical axis. The arrangement of the data assets shown in FIG. 6C is essentially FIG. 6A rotated by ninety degrees.

Accordingly, instead of the left-right, up-down, above-below, and other terminology, general terms such as a first direction and a second direction, a first axis and a second axis, or similar terms may be used to describe the directionality. For example, in a horizontal layout, the data assets arranged in a row and extending to the left and to the right from the data asset in the center (the data asset aligned with and directly above or below the primary data asset) may be described as data assets arranged in two opposite directions (left and right) along an axis (a horizontal axis).

Further, the row above the primary data asset may be described as a set of data assets that is arranged along a first axis (a horizontal axis) and that is located at a fixed distance away from the primary data asset in a first direction (a vertical upward direction) extending along a second axis (a vertical axis) that is perpendicular to the first axis (the horizontal axis). The row below the primary data asset may be described as a set of data assets that is arranged along the first axis (the horizontal axis) and that is located at a fixed distance away from the primary data asset in a second direction (a vertical downward direction) extending along the second axis (the vertical axis), where the second direction (the vertical downward direction) is opposite to the first direction (the vertical upward direction). Similar description for a vertical layout will become readily apparent to ordinarily skilled artisans and is therefore omitted for brevity.

Figure 7:
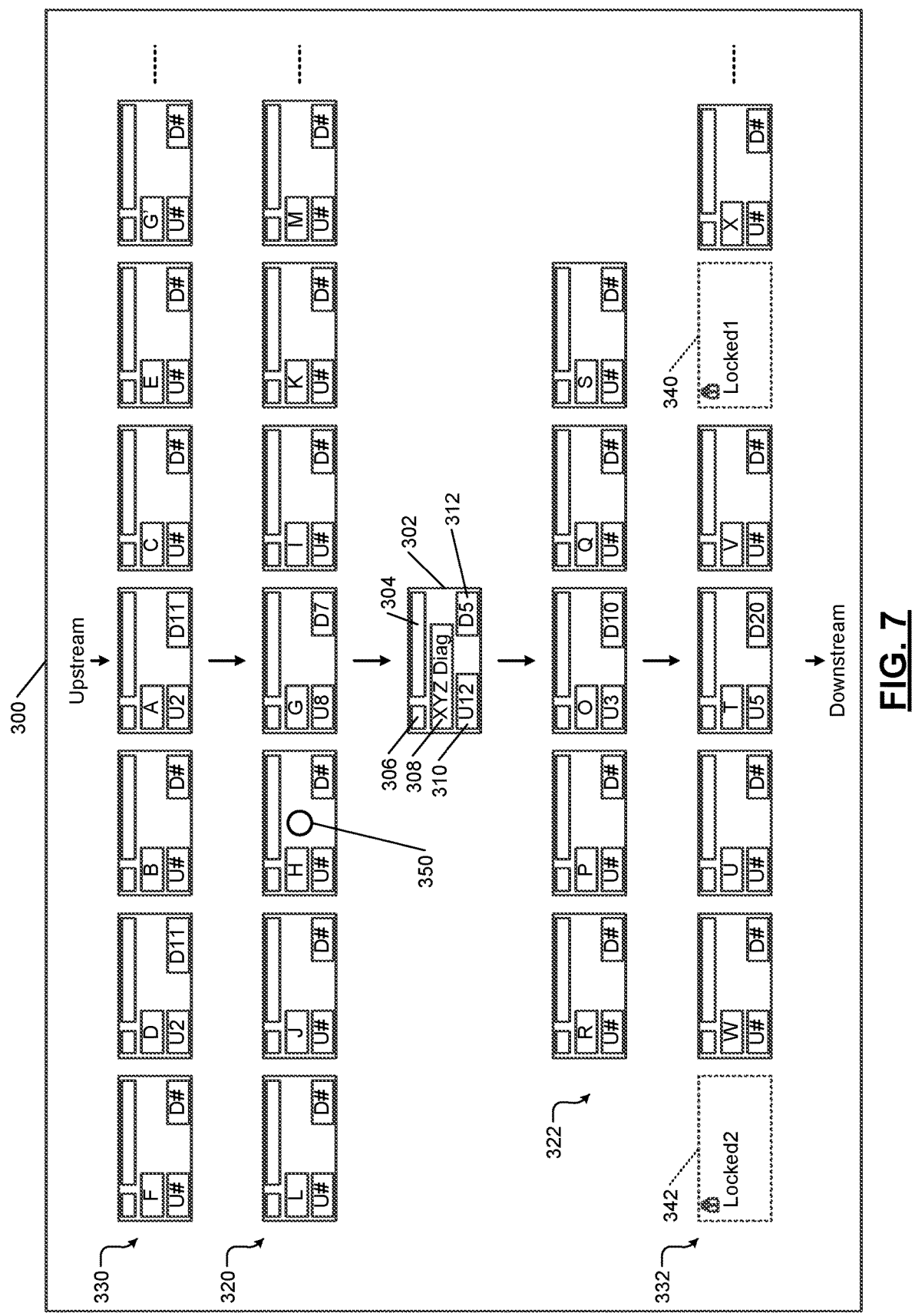
FIGS. 7-8B illustrate one example of a "carousal" feature of the lineage data processing system according to the present disclosure.
Figure 8A:
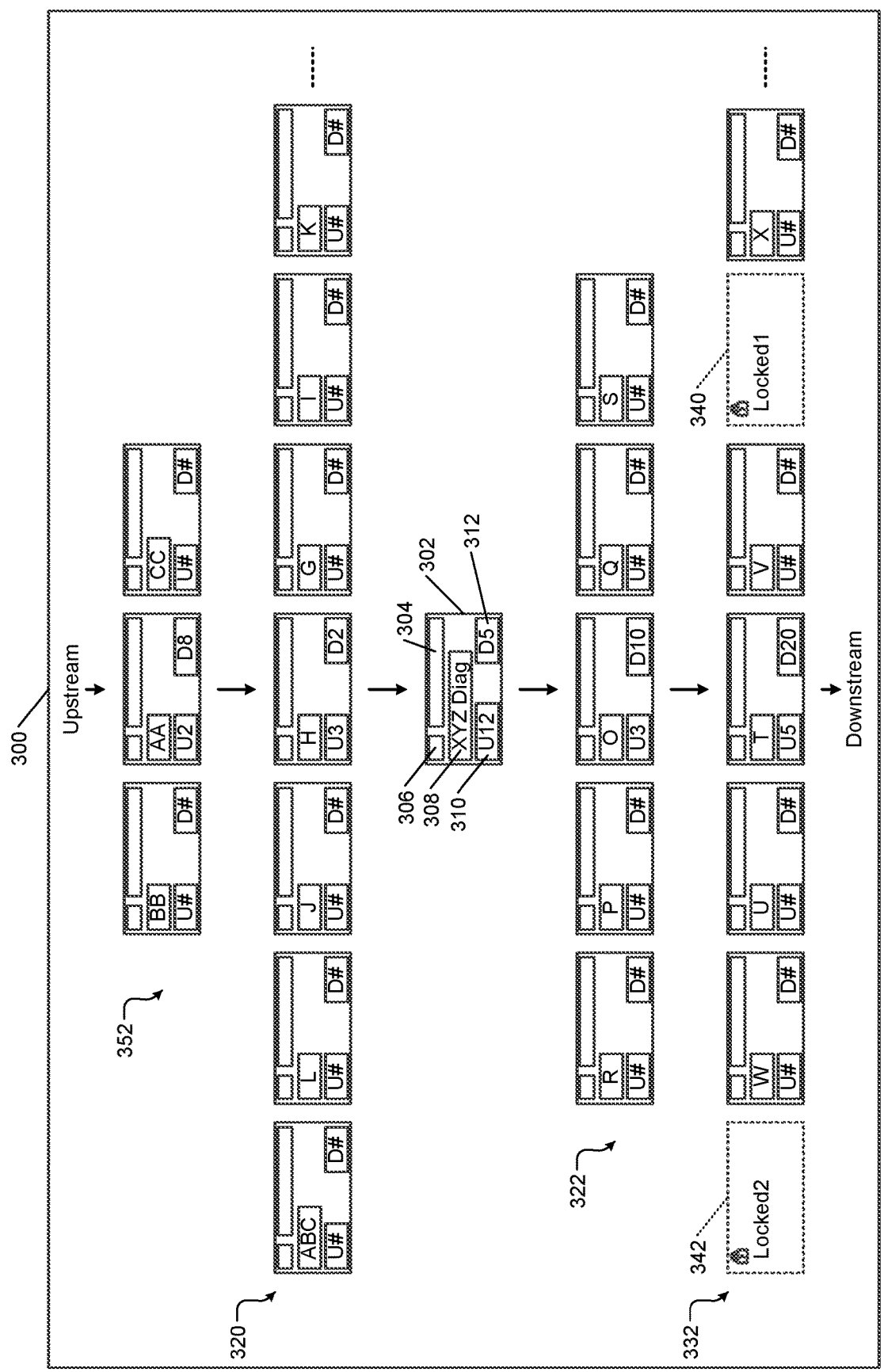
Figure 8B:
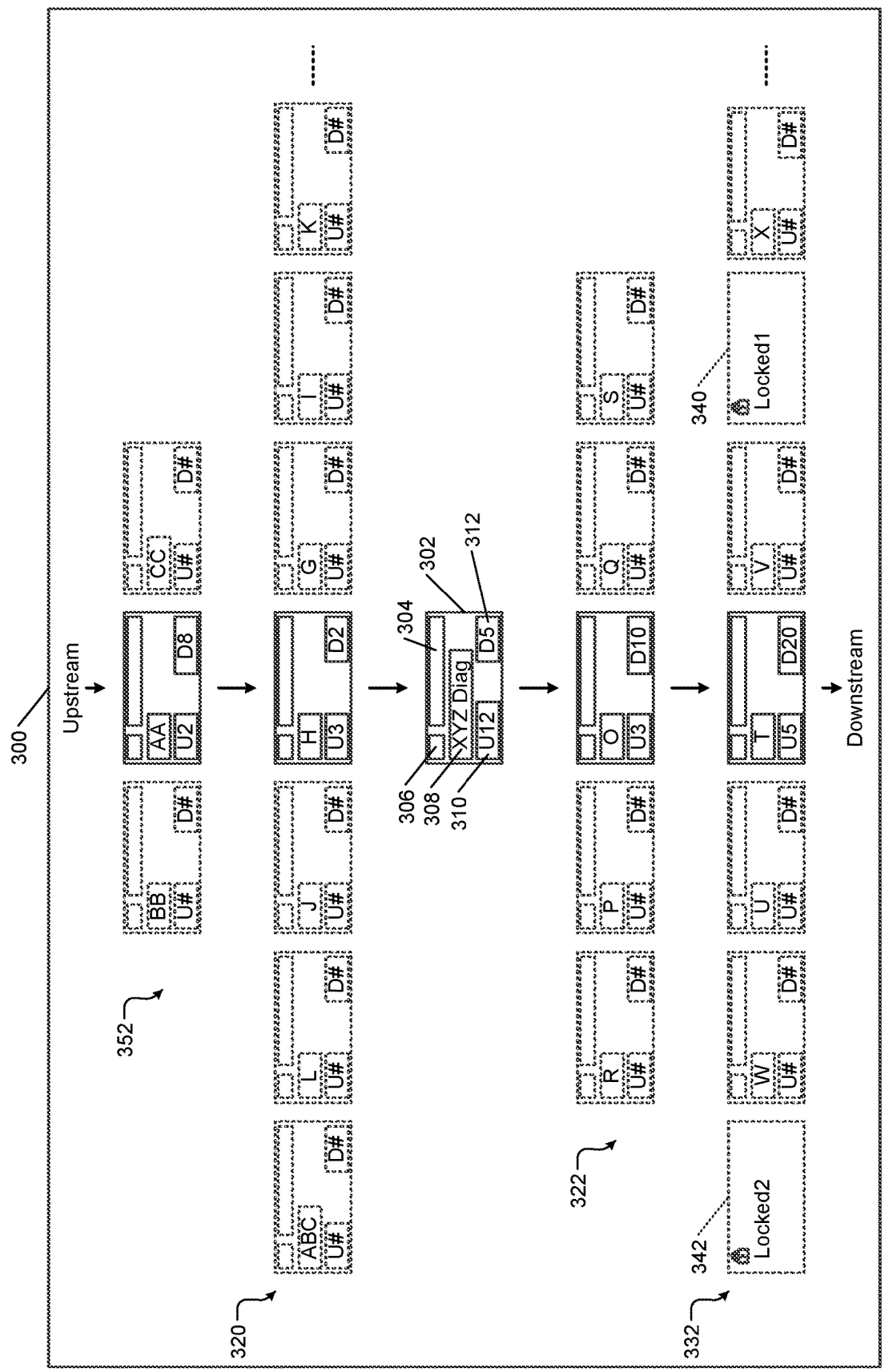

FIGS. 7-8B show one example of the carousal feature of the system according to the present disclosure. In FIG. 7, which shows the same arrangement of summaries of data assets as shown in FIG. 6A, suppose that the viewer wants to explore the lineage of the primary data asset via a different path upstream than via the data assets G and A. For example, instead of exploring an upstream path through the parent data asset G in the row 320 and the grandparent data asset A in the row 330, suppose that the viewer elects to explore an upstream path through a different parent data asset H in the row 320. To do so, suppose that the viewer selects (clicks on) the data asset H as shown at 350 in FIG. 7.

In FIG. 8A, since the selected data asset H is one position to the left of the data asset G, which was initially positioned in the row 320 (also called the parent row 320 for the primary data asset) directly above the primary data asset, the lineage application shifts the data assets in the row 320 by one position to the right. Due to the shift, the newly selected data asset H in the row 320 is positioned directly above the primary data asset as shown in FIG. 8. The summary of the newly selected data asset H shows that the data asset H is related to three upstream and two downstream data assets. One of the two downstream data asset to which the data asset H is related to is the primary data asset. A new row 352 shows the three upstream data assets to which the newly selected data asset H is related. The new row 352 (also called the grandparent row 352 for the primary data asset) replaces the row 330 (the earlier grandparent row for the primary data asset).

The new row 352 shows the summaries of the three new grandparent data assets AA, BB, and CC that are related upstream to the data asset H. The summaries of these data assets appear structurally and functionally similar to the summary 302 of the primary data asset. Therefore, separate reference numerals are not used to identify the elements of the summaries of these data assets. These data assets will be addressed by their names instead of reference numerals. In these summaries, the symbol "#" in the notations U# and D# denotes a nonnegative integer.

The summaries of the data assets in the row 352 are arranged as follows. The three new grandparent data assets AA, BB, and CC in the row 352 are ordered as AA, BB, and CC in the decreasing order of their usage. The data asset AA that has the most usage is positioned directly above the data asset H. The remaining data assets in the row 352 are arranged to the left and right of the data asset BB in decreasing order of their usage as explained above with reference to data assets in the rows 320, 322, 330, and 332. While the summary of the data asset AA indicates that the data asset AA is related to two upstream data assets and eight downstream data assets, none of the two upstream data assets is currently shown (although may be shown as explained below), and only one of the eight downstream data assets (the data asset H) is shown.

Based on the information visible after selecting (clinking on) the data asset H and may be by subsequently selecting (clinking on) some other data asset(s) in the row 320, the viewer can decide whether to pursue the path upstream via the data asset H or via some other data asset in the row 320. Thus, the carousal feature makes the search, retrieval, and analysis of the lineage data of the primary data asset quick and efficient.

FIG. 8B shows that in some implementations, only the primary data asset and the data assets that are aligned vertically with the primary data asset in each row may be emphasized (highlighted or shown at a first intensity or in a first color). All other data assets in each row may be shown de-emphasized (faded or shown at a lower intensity than the first intensity or in a second color). The fading may be gradual instead of being of the same lower intensity or of the same second color. Different color schemes may be used instead of or in addition to fading to contrast the primary data asset and the data assets that are aligned vertically with the primary data asset from the rest of the data assets in each row. The operation of the carousal feature in case of a vertical layout of the data assets will become readily apparent to ordinarily skilled artisans from the above description, and the description of the operation of the carousal feature in case of a vertical layout of the data assets is therefore omitted for brevity.

Figure 9:
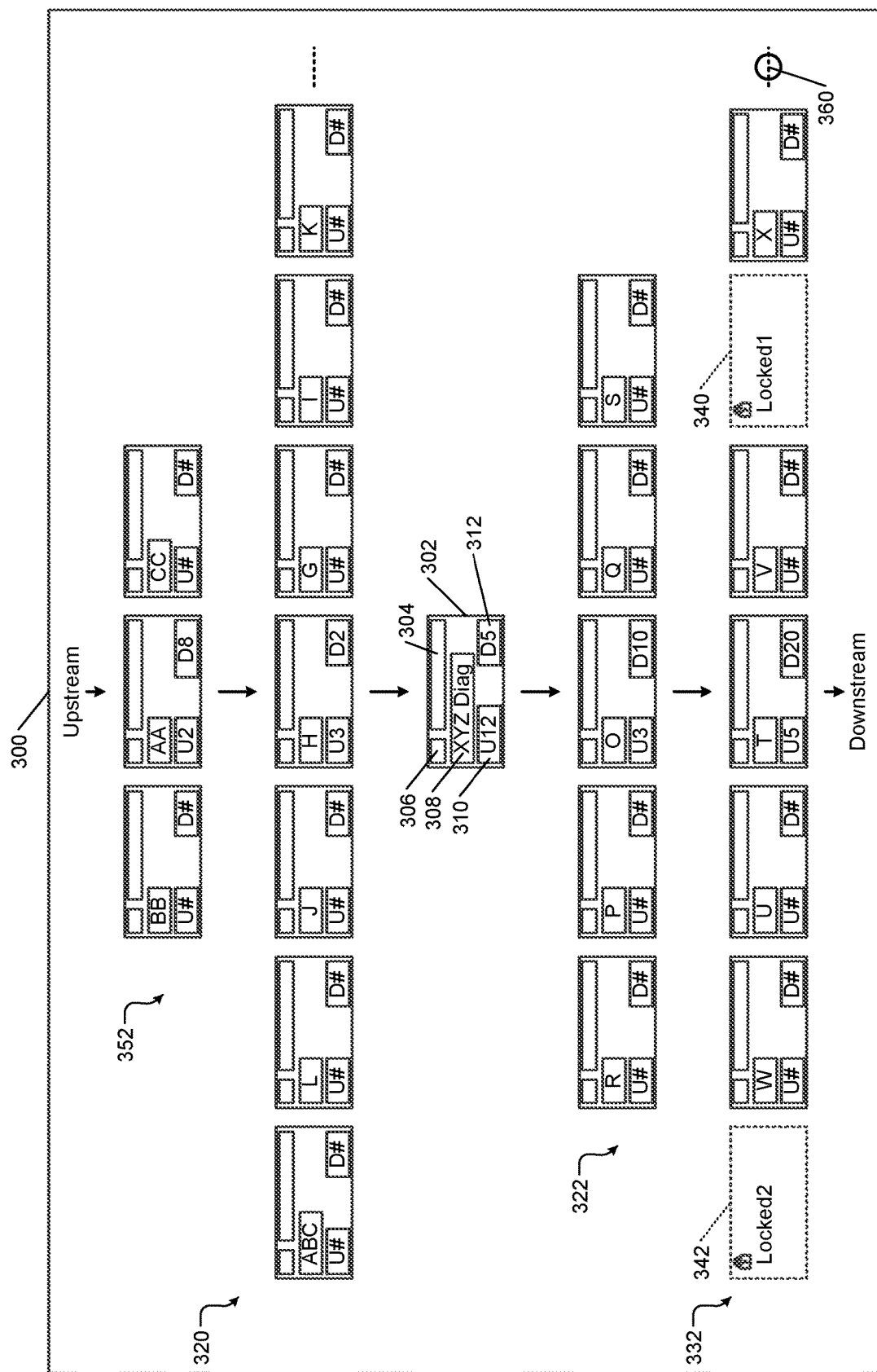
FIGS. 9-10B illustrate another example of the "carousal" feature of the lineage data processing system according to the present disclosure.
Figure 10A:
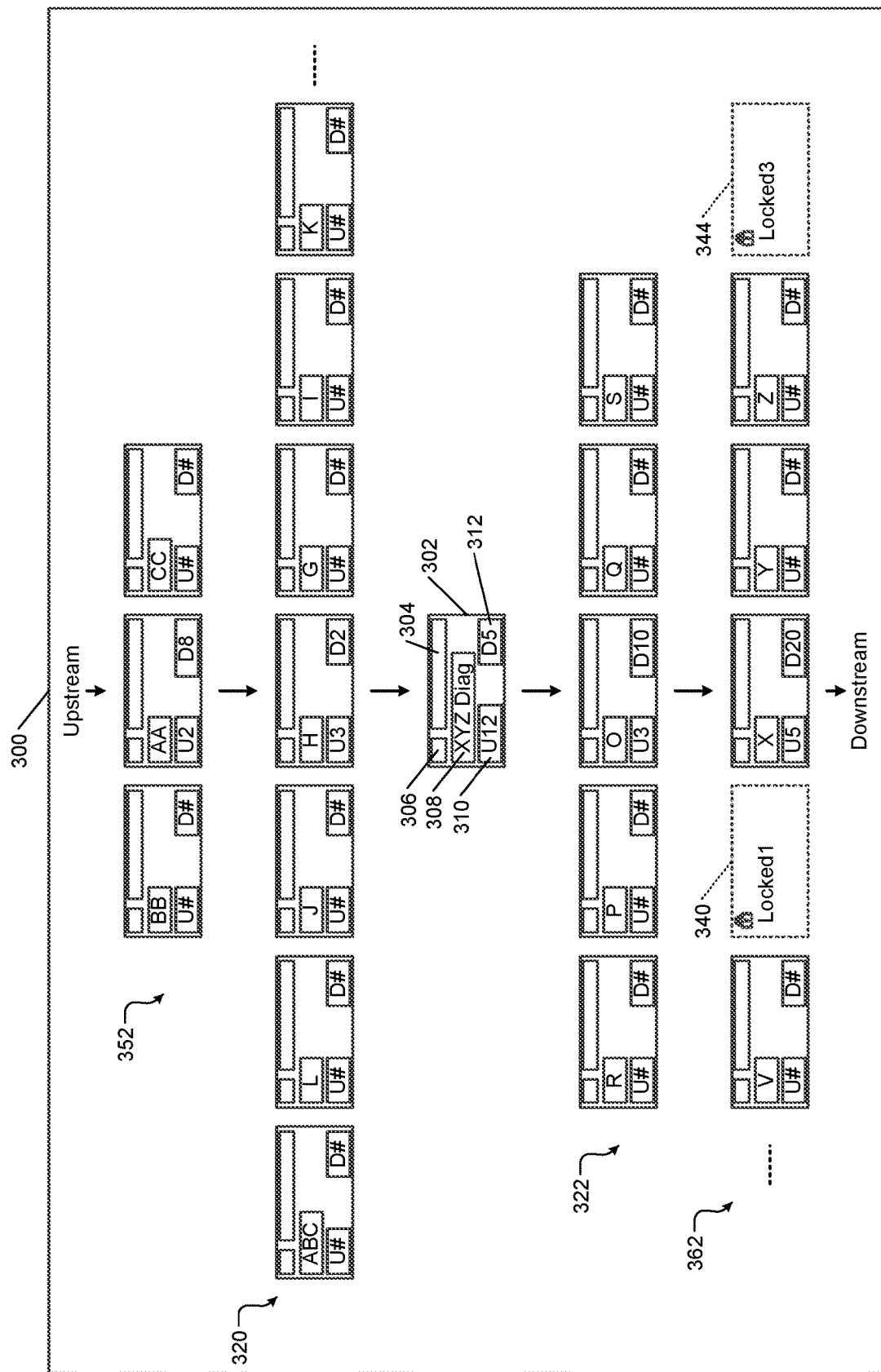
Figure 10B:
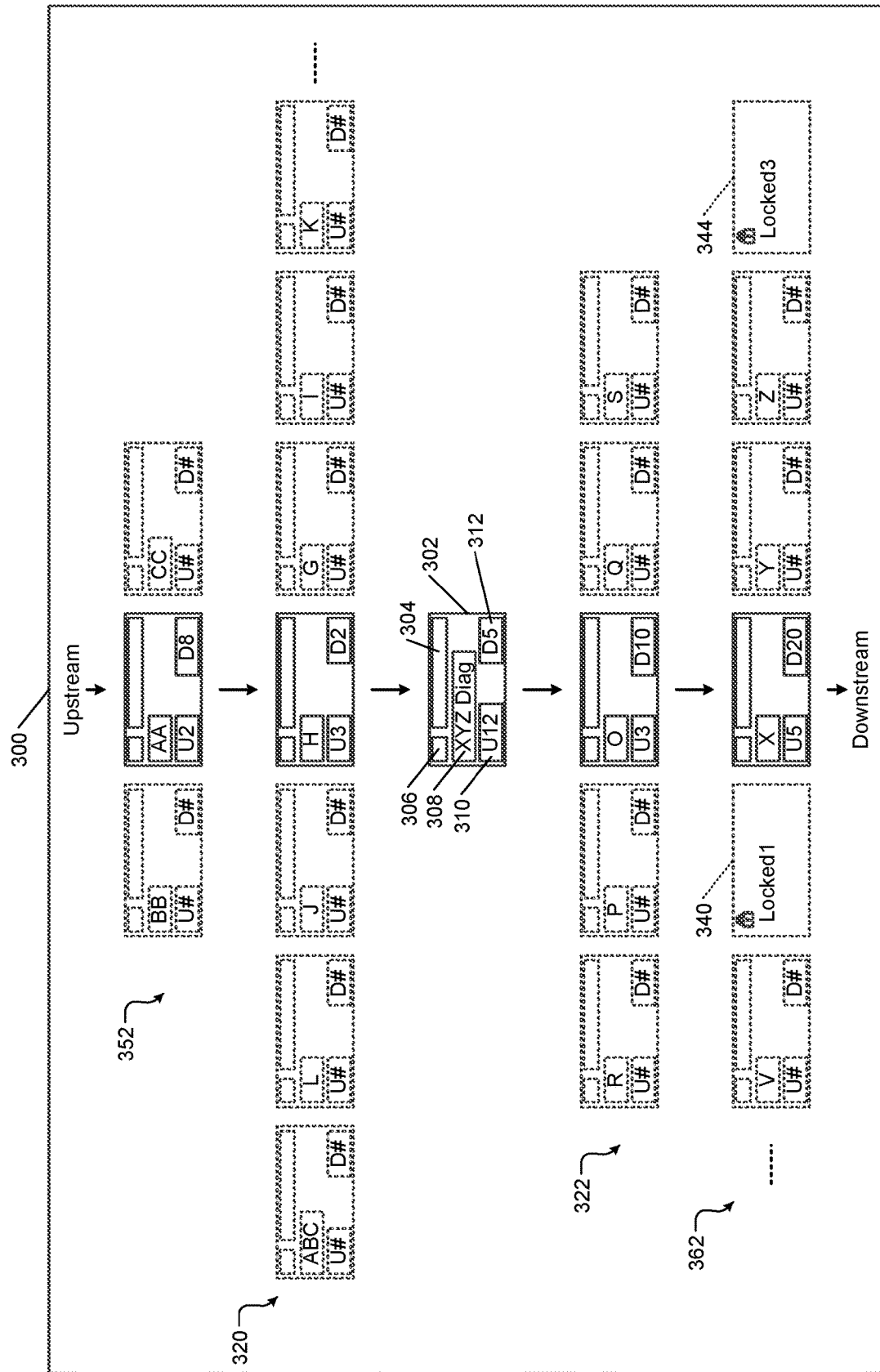

FIGS. 9-10B show another example of the carousal feature of the system according to the present disclosure. In FIG. 9, which shows the same arrangement of summaries of data assets as shown in FIG. 8A, suppose that the viewer wants to explore the lineage of the primary data asset via a different path downstream than via the data assets O and T. For example, instead of exploring a downstream path through the child data asset O in the row 322 (also called the child row 322 for the primary data asset) and the grandchild data asset T in the row 332 (also called the grandchild row 322 for the primary data asset), suppose that the viewer elects the following: to explore a downstream path through the child data asset O in the child row 322 and a different grandchild data asset to the right of the grandchild data asset X (e.g., a grandchild data asset that is currently not visible but is to the right of the data asset X) in the grandchild row 332. To do so, suppose that the viewer selects (clicks on) the ellipses (or, if shown, a partial summary of a data asset) to the right of the data asset X as shown at 360 in FIG. 9.

In FIG. 10A, due to the new selection (the user clicking on the ellipses to the right of the data asset X as shown at 360 in FIG. 9), the lineage application shifts the data assets in the row 332 to the left to display the previously not visible data assets in the row 332 as shown in the row 362 in FIG. 10A. For example, the shifted data assets in the row 362 are displayed in the following order as shown in FIG. 10A: V, Locked1, X, Y, Z, and Locked3 (shown at 344), with the ellipses now displayed to the left of the data asset V, indicating that there are more data assets (Locked2, W, U, and T) to the left of the data asset V, which were previously visible but are now not displayed due to the shift.

While not shown, after shifting and displaying new data assets in a row, if additional data assets remain un-displayed to the right side of the row, this fact can be indicated by displaying ellipses to the right side of the row (e.g., to the right of element 344 in the row 362). Further, after clicking on the ellipses on the right of a row (e.g., at 360 as shown in FIG. 9), when the data assets in the row are shifted to the left (e.g., as shown in the row 362 in FIG. 10A), any data asset to the right of the data asset that is displayed in the center of the row before shifting (e.g., any of the data assets to the right of the data asset T in the row 332 in FIG. 9) may be displayed as the new data asset in the center of the shifted row.

For example, the newly selected data asset for displaying at the center of the shifted row may include the last data asset visible in the row before shifting (e.g., the data asset X in the row 332) or a next data asset or any data asset to the right of the last visible data asset in the row (e.g., to the right of the data asset X in the row 332). Similar procedure can be followed when ellipses on the left side of a row is clicked.

The summary of the new data asset X positioned directly below the data asset O shows that the data asset X is related to five data assets upstream and 20 data assets downstream. One of the five upstream data assets to which the data asset X is related to is the data asset O. None of the 20 downstream data assets to which the data asset X is connected is shown (although may be shown as explained below).

Based on the information visible in the row 362, which is obtained after selecting (clinking on) the ellipses to the right of the data asset X in the row 332, the viewer can decide whether to pursue the path downstream via the new grandchild data asset X or via some other data asset that is now displayed in the row 362. Thus, the carousal feature makes the search, retrieval, and analysis of the lineage data of the primary data asset quick and efficient.

The viewer can select (click on) any other data asset in any of the displayed rows, and the lineage application will position the selected data asset as explained above with reference to the selection of the data asset H and the display of the data asset X. The lineage application will retrieve and display a new row of upstream or downstream relationships of the selected data asset as explained above with reference to the row 352. Therefore, while additional examples of the carousal feature of the system are contemplated, further explanations of such other examples are omitted for brevity.

Thus, the procedure for sorting, arranging, and shifting data assets in a row can be generally described as follows. For a given data asset, a list of parent data assets (i.e., data assets one level upstream from the given data asset) and children data assets (i.e., data assets one level downstream from the given data asset) is compiled. Each list is then ordered or sorted (i.e., the data assets in the list are arranged sorted in order) according to a decreasing order of usage of the data assets in the list. From the list of the data assets upstream from the given data asset, the most used data asset (i.e., most searched or refer to data asset by users of the lineage application) upstream from the given data asset is arranged directly above the given data asset in a parent row above the given data asset. From the list of the data assets downstream from the given data asset, the most used data asset (i.e., most searched or refer to data asset by users of the lineage application) downstream from the given data asset is arranged directly below the given data asset in a child row below the given data asset.

In each row, the remaining data assets in the respective list are arranged as follows. A second most used data asset (i.e., a data asset used less than the first most used data asset arranged in the center) is displayed to the left of the first most used data asset arranged in the center. A third most used data asset (i.e., a data asset used less than the second most used data asset) is displayed to the right of the first most used data asset arranged in the center. A fourth most used data asset (i.e., a data asset used less than the second most used data asset) is displayed to the left of the second most used data asset. A fifth most used data asset (i.e., a data asset used less than the fourth most used data asset) is displayed to the right of the third most used data asset. This process is called left, right, left, right arrangement process.

The left, right, left, right process is continued until a predetermined number of data assets are displayed in a row. For example only, the predetermined number of data assets in a row may be seven, five, nine, or any suitable but a relatively small number. The remaining data assets from the list that are beyond the predetermined number of data assets and that are therefore not displayed in the row are arranged to the right of the last data asset displayed in the row. These remaining data assets are arranged from left to right in plain decreasing order of their usage (called a left to right process) to the right of the last data asset displayed in the row. The left, right, left, right, process is not used to arrange these remaining data assets. For example, if these data assets are DA1, DA2, DA3, and DA4, and if DA2 is used less than DA1, DA3 is used less than DA2, and DA4 is used less than DA3, then these data assets will be arranged according to the left to right process in the following order: DA1, DA2, DA3, and DA4 and not in this order: DA4, DA2, DA1, and DA3, which would be the left, right, left, right process. These remaining data assets may be shown by partially displaying one of the remaining data assets or by using ellipses to the right of the row.

The following procedure is used to shift data assets in a row when the user clicks on the ellipses (or on the partially displayed summary of one of the remaining data assets) to the right of the row. The data assets in the row are shifted to the left. One or more of the remaining data assets to the right of the row that were not displayed earlier are now displayed in the row. If there are additional remaining data assets to the right of the row after shifting, this fact is indicated by displaying either a partially displayed summary of one of the still remaining data assets or by displaying ellipses to the right of the shifted row.

Further, due to the limited capacity of each row to display a predetermined number (e.g., 7) of data assets at a time, the data assets that were earlier displayed on the left-hand side of the row before shifting are now not be displayed in the shifted row. These data assets that now cannot be displayed in the shifted row are indicated by displaying an ellipses or a partial summary of the data asset that was previously visible to the left of the shifted row. A similar process is used to shift data assets in a row when the user clicks on any data asset that is displayed in the row to the left or to the right of the data asset in the center of the row. In this manner, the data assets in a row can be shifted to the left or to the right like a carousal.

The procedure for sorting, arranging, and shifting data assets in a row generally described above can be extended to any row (e.g., grandparent row, grandchild row, and so on). Based on the information visible after selecting (clinking on)

additional data assets in this manner, the viewer can decide which path to pursue upstream or downstream. Thus, the carousal feature makes the search, retrieval, and analysis of the lineage data of the primary data asset quick and efficient.

FIG. 10B shows that in some implementations, only the primary data asset and the data assets that are aligned vertically with the primary data asset in each row may be emphasized (highlighted or shown at a first intensity or in a first color). All other data assets in each row may be shown de-emphasized (faded or shown at a lower intensity than the first intensity or in a second color). The fading may be gradual instead of being of the same lower intensity or of the same second color. Different color schemes may be used instead of or in addition to fading to contrast the primary data asset and the data assets that are aligned vertically with the primary data asset from the rest of the data assets in each row. The operation of the carousal feature in case of a vertical layout of the data assets will become readily apparent to ordinarily skilled artisans from the above description, and the description of the operation of the carousal feature in case of a vertical layout of the data assets is therefore omitted for brevity.

The following description explains how the repositioning of a newly selected parent data asset and corresponding grandparent data assets is performed. The repositioning of the newly selected parent data asset and corresponding grandparent data assets is performed as follows.

As explained above in the description of how the number of upstream and downstream relationships of a data asset (shown in the summary as Uxx and Dyy) are determined, a network of relationships is being built and updated as data assets get added into the asset data catalog. The network of relationships is used to capture the information of which data assets are upstream and which data assets are downstream from a given data asset and how the given data asset is related to other data assets upstream and downstream. Accordingly, when the user selects a different parent data asset, the number of upstream and downstream relationships of the newly selected parent data asset is already shown in the summary of the newly selected parent data asset. Therefore, the context information is available in the form of network of relationships. When the user clicks on the new parent data asset, the lineage program simply locates the new grandparents of the primary data asset through the newly selected parent data asset using the context information that is available in the form of network of relationships.

The grandparent relationships of the primary data asset through the newly selected parent data asset are not dynamically determined. Rather, the grandparent relationships are already captured (populated) and updated as the relationship tree in the data asset catalog grows, and is therefore predetermined. For performance reasons, the lineage program fetches the detailed information for the primary data asset, as well as the data assets that will be displayed (e.g., in the parent, grandparent, child, and grandchild rows). This initial load will contain the data #U and #D for all the assets that are displayed, thereby providing the users with a complete picture. As the users navigate the carousal and click on additional parent/child assets, detailed information about that relationship is loaded and displayed. Some of the additional relationships are displayed by replacing some of the previously displayed relationships (e.g., grandparent data assets through the previous parent data asset). In this manner, the newly selected parent data asset and corresponding grandparent data assets are repositioned relative to the primary data asset.

The repositioning of a newly selected child data asset and corresponding grandchild data assets will become readily apparent to ordinarily skilled artisans from the above description. Accordingly, the description of the repositioning of a newly selected child data asset and corresponding grandchild data assets is omitted for brevity.

In FIGS. 11A-12B, the system according to the present disclosure can also be used to display additional hierarchical levels. For example, in FIG. 11A, the primary data asset can be displayed at the bottom of the screen, and additional rows of data assets can be displayed above the grandparent row 330 (without losing focus on the primary data asset). For example, a row 370 of great grandparent data assets AA-DD of the primary data assets can be displayed. Additionally, a row 372 of great great grandparent data assets AAA-CCC of the primary data assets can be displayed. The sorting and arrangement of data assets in the rows 370 and 372 may be similar to that explained above with reference to FIGS. 6A-10B. Alternatively, while not shown, instead of showing the row 372, the row 322 may be shown below the primary data asset as shown in FIG. 6A. For example, the view in FIG. 11 can be obtained by scrolling up in the view of FIG. 6A. The summaries of these data assets and the arrangements of these data assets in the respective rows are similar to the corresponding description provided above and is therefore not repeated. Because of the summary information displayed, showing the additional hierarchical levels in this manner also makes the search, retrieval, and analysis of the lineage data of the primary data asset quick and efficient.

Figure 11A:
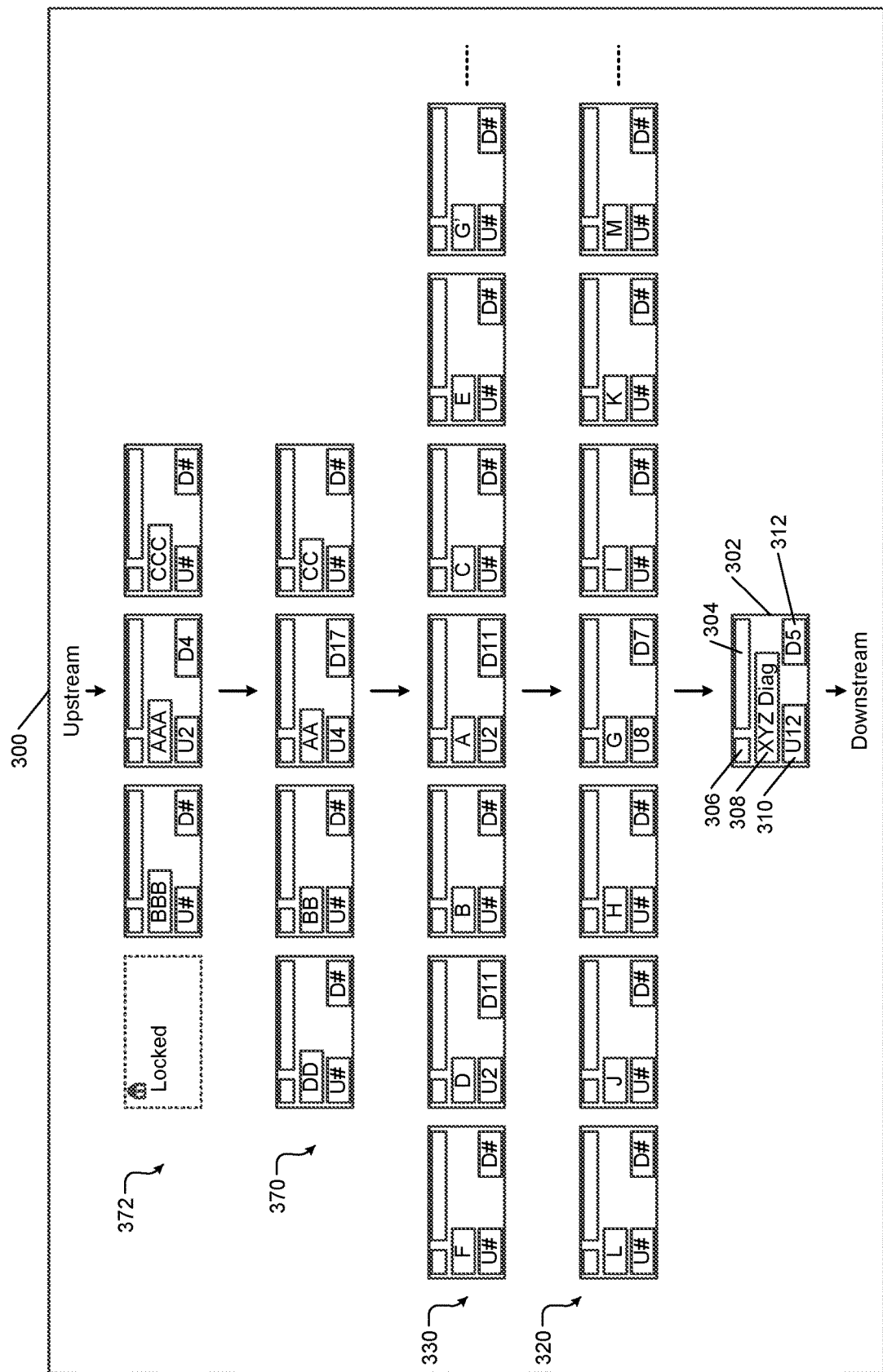
FIGS. 11A-12B illustrate examples of displaying additional levels of lineage data using the lineage data processing system according to the present disclosure.
Figure 11B:
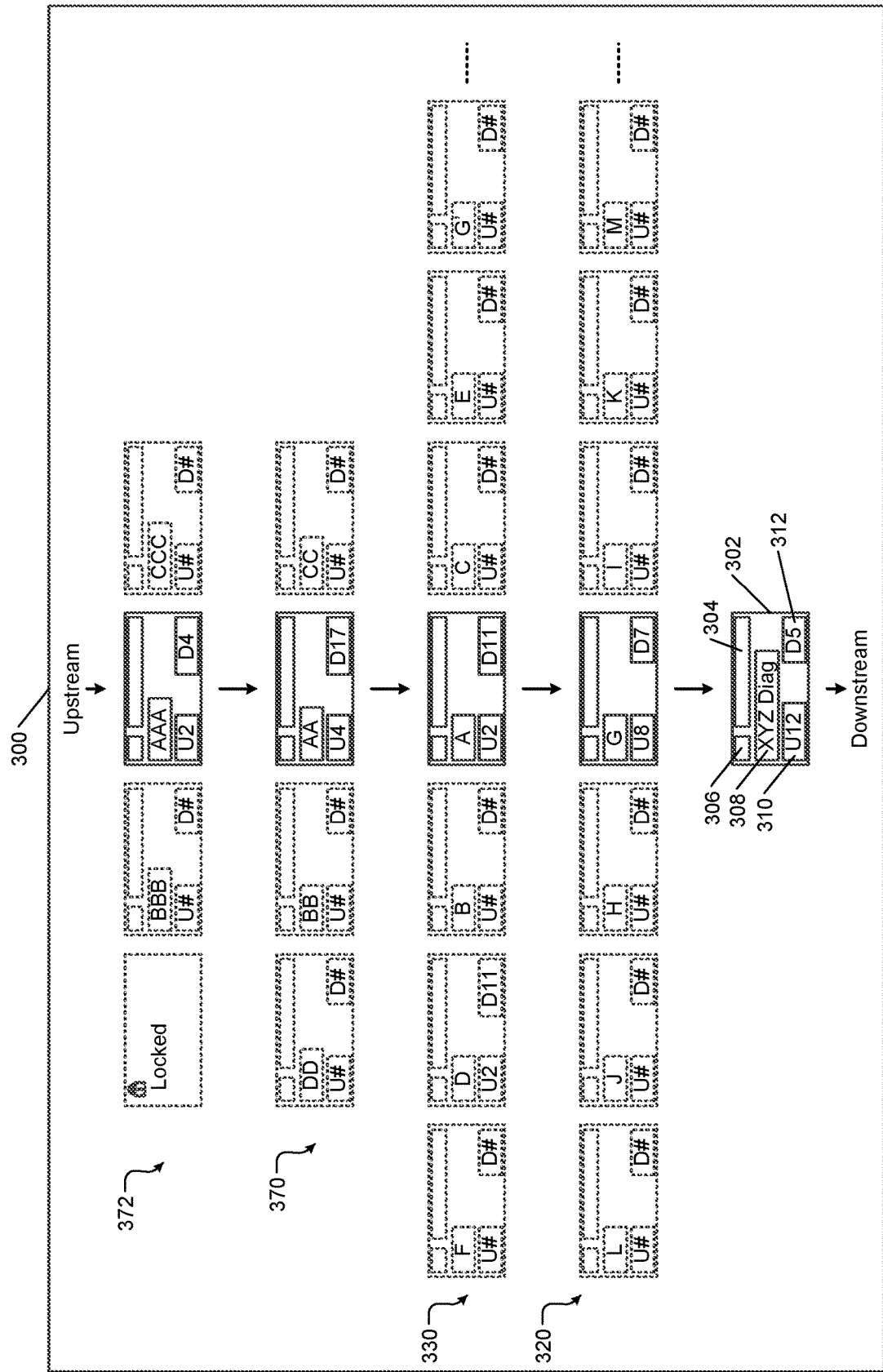

FIG. 11B shows that in some implementations, only the primary data asset and the data assets that are aligned vertically with the primary data asset in each row may be emphasized (highlighted or shown at a first intensity or in a first color). All other data assets in each row may be shown de-emphasized (faded or shown at a lower intensity than the first intensity or in a second color). The fading may be gradual instead of being of the same lower intensity or of the same second color. Different color schemes may be used instead of or in addition to fading to contrast the primary data asset and the data assets that are aligned vertically with the primary data asset from the rest of the data assets in each row.

Figure 12A:
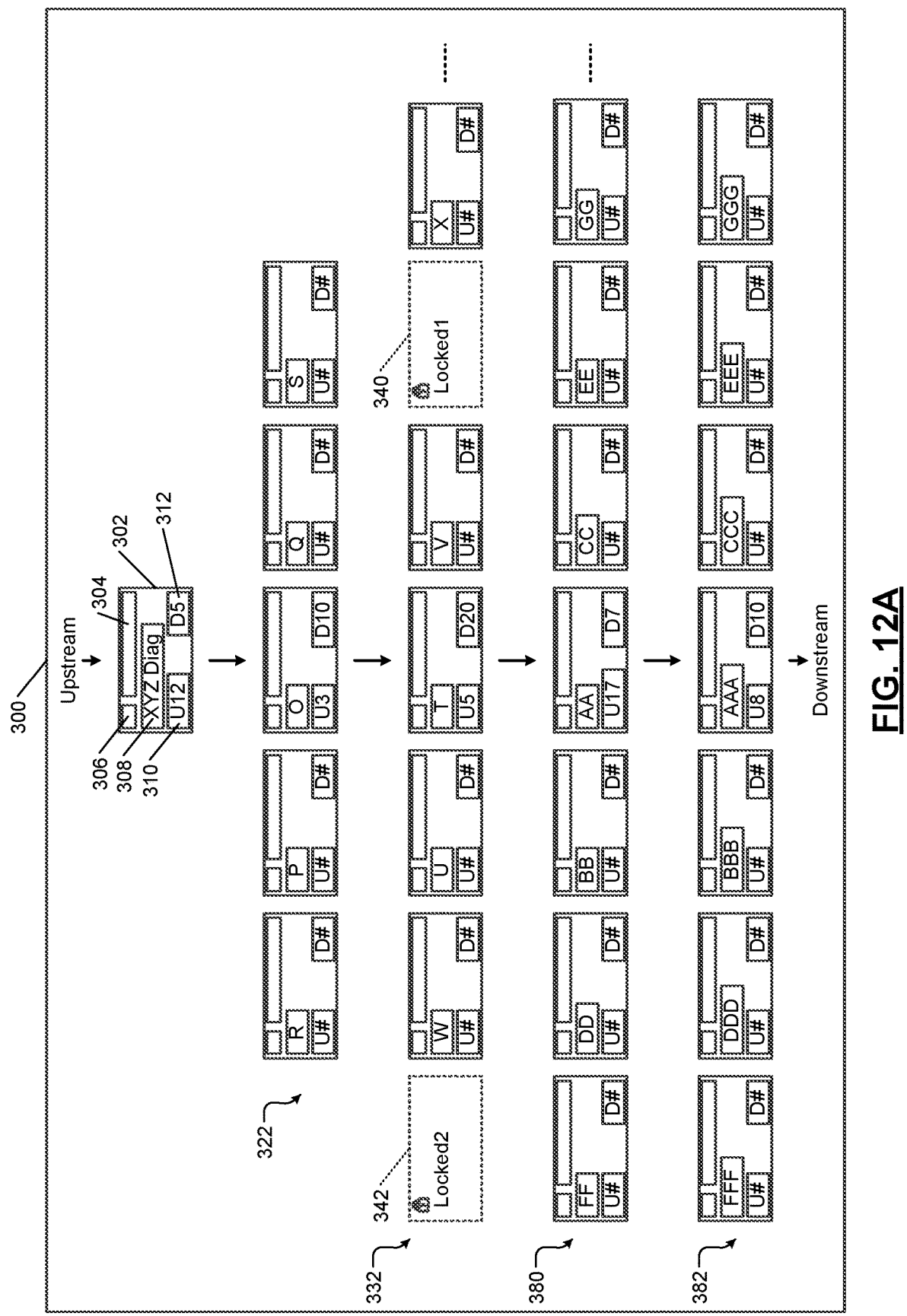

In FIG. 12A, for example, the primary data asset can be displayed at the top of the screen, and additional rows of data assets can be displayed below the grandchild row 332 (without losing focus on the primary data asset). For example, a row 380 of great grandchildren data assets AA-GG of the primary data assets can be displayed. Additionally, a row 382 of great great grandchildren data assets AAA-GGG of the primary data assets can be displayed. The sorting and arrangement of data assets in the rows 380 and 382 may be similar to that explained above with reference to FIGS. 6A-10B. Alternatively, while not shown, instead of showing the row 382, the row 320 may be shown above the primary data asset as shown in FIG. 6A. For example, the view in FIG. 11A can be obtained by scrolling down in the view of FIG. 6A. The summaries of these data assets and the arrangements of these data assets in the respective rows are similar to the corresponding description provided above and is therefore not repeated. Because of the summary information displayed, showing the additional hierarchical levels in this manner also makes the search, retrieval, and analysis of the lineage data of the primary data asset quick and efficient.

Figure 12B:
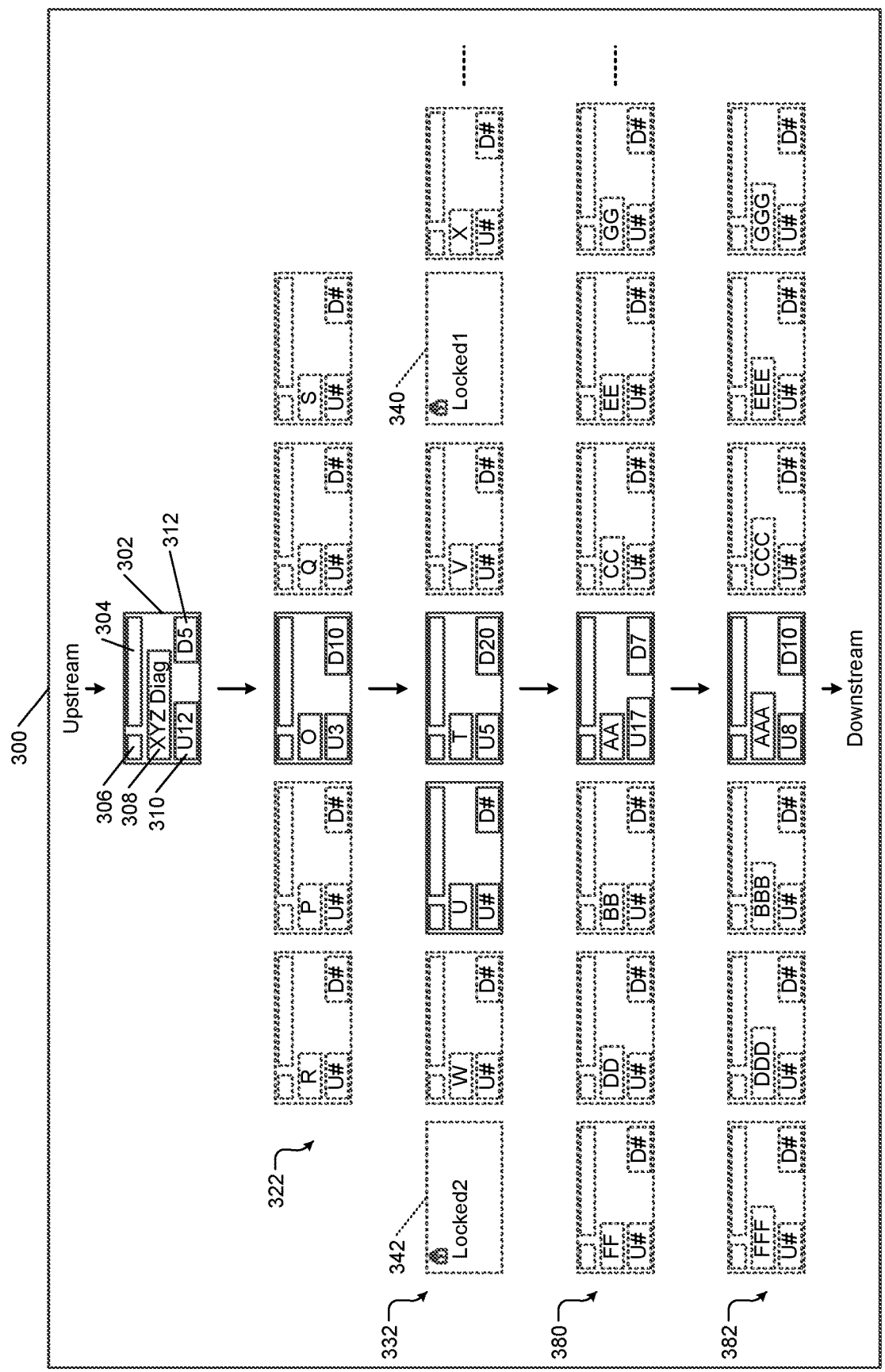

FIG. 12B shows that in some implementations, only the primary data asset and the data assets that are aligned vertically with the primary data asset in each row may be emphasized (highlighted or shown at a first intensity or in a first color). All other data assets in each row may be shown de-emphasized (faded or shown at a lower intensity than the first intensity or in a second color). The fading may be gradual instead of being of the same lower intensity or of the same second color. Different color schemes may be used instead of or in addition to fading to contrast the primary data asset and the data assets that are aligned vertically with the primary data asset from the rest of the data assets in each row.

In FIGS. 11A-12B, the limited and focused display allows the user to have a focused view of a limited portion of the lineage data of the primary data asset since the view is not cluttered with the entire end-to-end lineage data of the primary data asset. This focused view enables the user to quickly analyze the displayed limited lineage data of the primary data asset and decide based on the information contained in the displayed summaries which path to select in the lineage of the primary data asset to further search, retrieve, and analyze additional lineage data of the primary data asset.

While not shown in FIGS. 6A-10B, depending on the size and resolution of the display 156 or 176 (e.g., depending on whether the client device 120 is a handheld device such as a smartphone or a tablet or a laptop computer), the system according to the present disclosure can be used to display additional but limited number of hierarchical levels. For example, in FIGS. 6A-10B, one or more of a great grandparent row and a great grandchild row of data assets may be shown. Further, in FIGS. 11A-12B, at least one level of relationship may be shown below and above the primary data asset, respectively, in addition to or at the expense of one or more of the rows shown. Because of the summary information displayed, showing the additional hierarchical levels in this manner also makes the search, retrieval, and analysis of the lineage data of the primary data asset quick and efficient.

Figure 13:
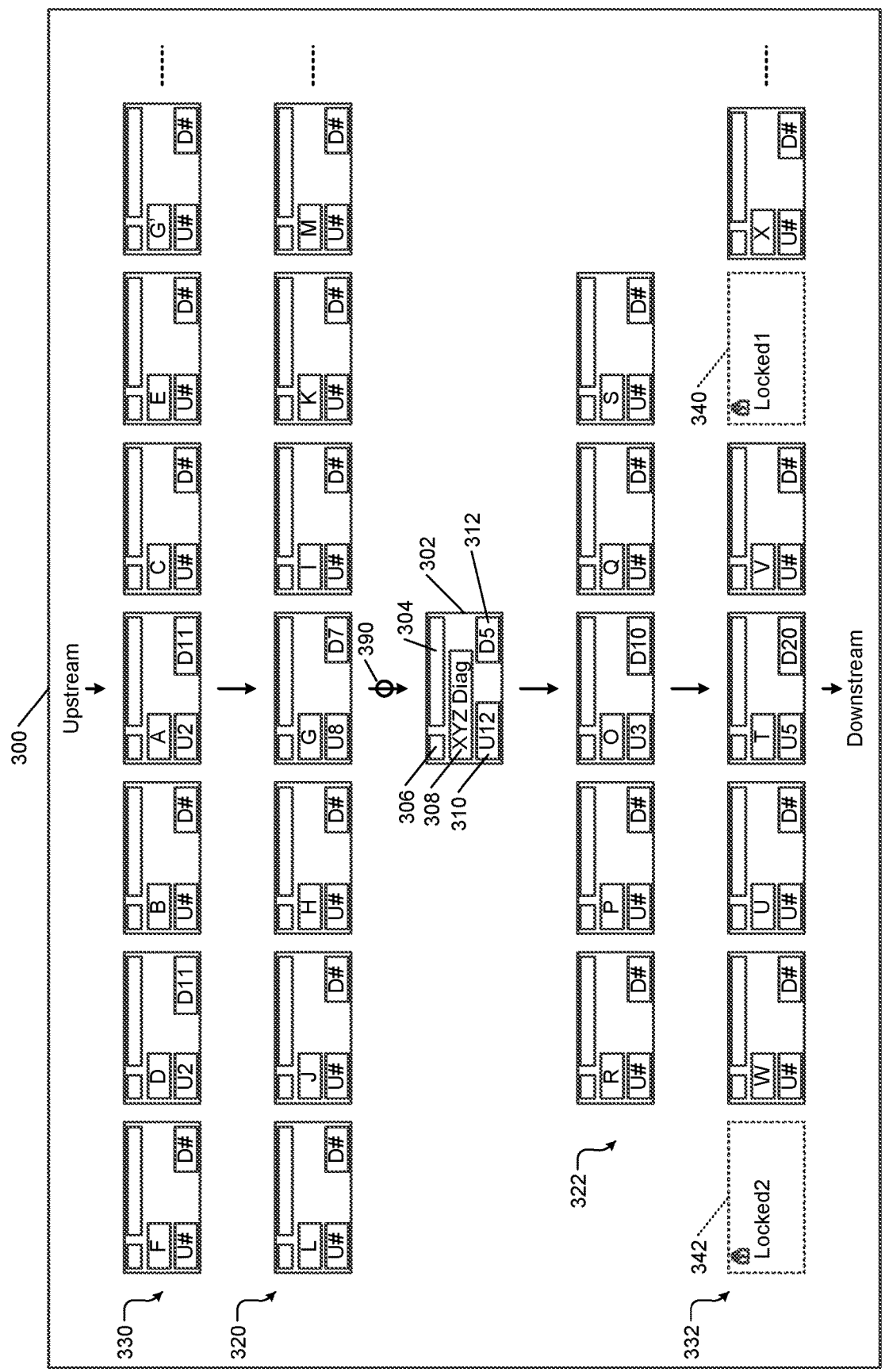
FIGS. 13 and 14 show examples of displaying additional information about the lineage data using the lineage data processing system according to the present disclosure.
Figure 14:
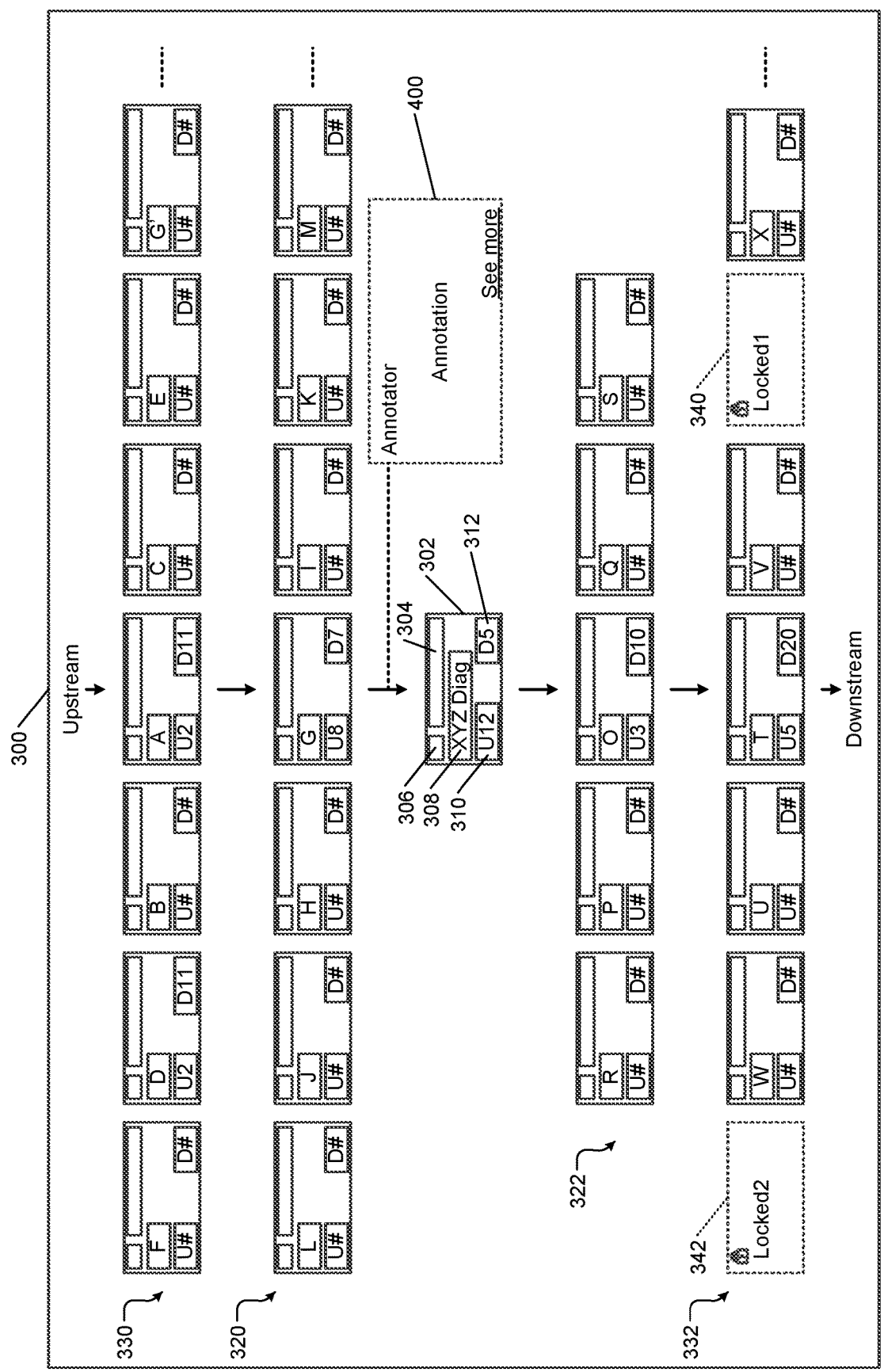

FIGS. 13-14 show that the lineage application can display additional information about the data transformation that occurred when an upstream data asset was used to generate a downstream data asset. For example, the lineage application can display additional information when the viewer positions the cursor above a link as shown at 390 in FIG. 13. The link may be any link (shown as downward pointing arrow) between the data assets A, G, XYZ, O, and T (arranged directly above and below the primary data asset XYZ). The lineage application opens a box 400 as shown in FIG. 14, which includes the additional information (also called link information).

For example, the additional information may include one or more of the following: the identification information of the annotator who added the annotation, the annotation (e.g., the name of the application that performed the transformation), and a hyperlink shown as "See more" for further information. The viewer can click on the hyperlink to view further information. This information can also make the search, retrieval, and analysis of the lineage data of the primary data asset quick and efficient.

The link information further augments the user's ability to quickly analyze the displayed limited lineage data of the primary data asset and decide based on the link information which path to select in the lineage of the primary data asset to further search, retrieve, and analyze additional lineage data of the primary data asset.

FIGS. 15-20 show methods for displaying lineage data using the system according to the present disclosure. The methods can be performed by the lineage application described above with references to FIGS. 1-14. In the following discussion, control refers to the lineage application described above.

Figure 15:
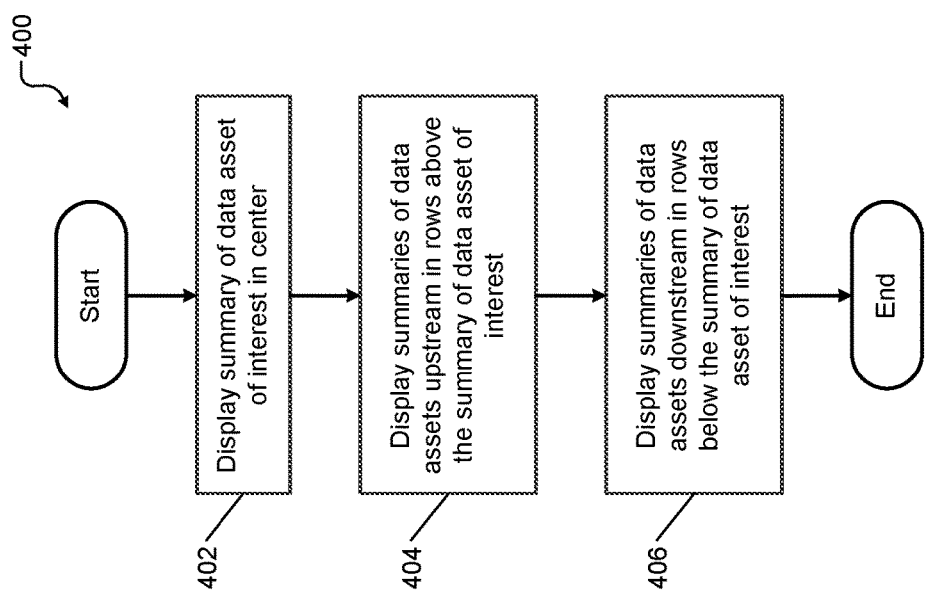

FIG. 15 shows a method 400 for displaying lineage data of a selected data asset using the lineage application according to the present disclosure. At 402, control displays a summary of the selected data asset of interest (primary data asset) at the center of the screen. At 404, control displays summaries of data assets that are upstream from the primary data asset and that are related to the primary data asset at parent and grandparent levels in respective rows above the summary of the primary data asset. At 406, control displays summaries of data assets that are downstream from the primary data asset and that are related to the primary data asset at child and grandchild levels in respective rows below the summary of the primary data asset.

In addition, while not shown, control can display two more rows: one row above the grandparent row, including summaries of data assets that are upstream from the primary data asset and that are related to the primary data asset at great grandparent level; and another row below the grandchild row, including summaries of data assets that are downstream from the primary data asset and that are related to the primary data asset at great grandchild level.

All of the above teachings explained with reference to horizontal layouts of data assets apply to vertical layouts of data assets. The operation of all of the above features in vertical layouts will become readily apparent to ordinarily skilled artisans from the above description provided for horizontal layouts. The operation of all of the above features in vertical layouts is therefore omitted for brevity.

Figure 16:
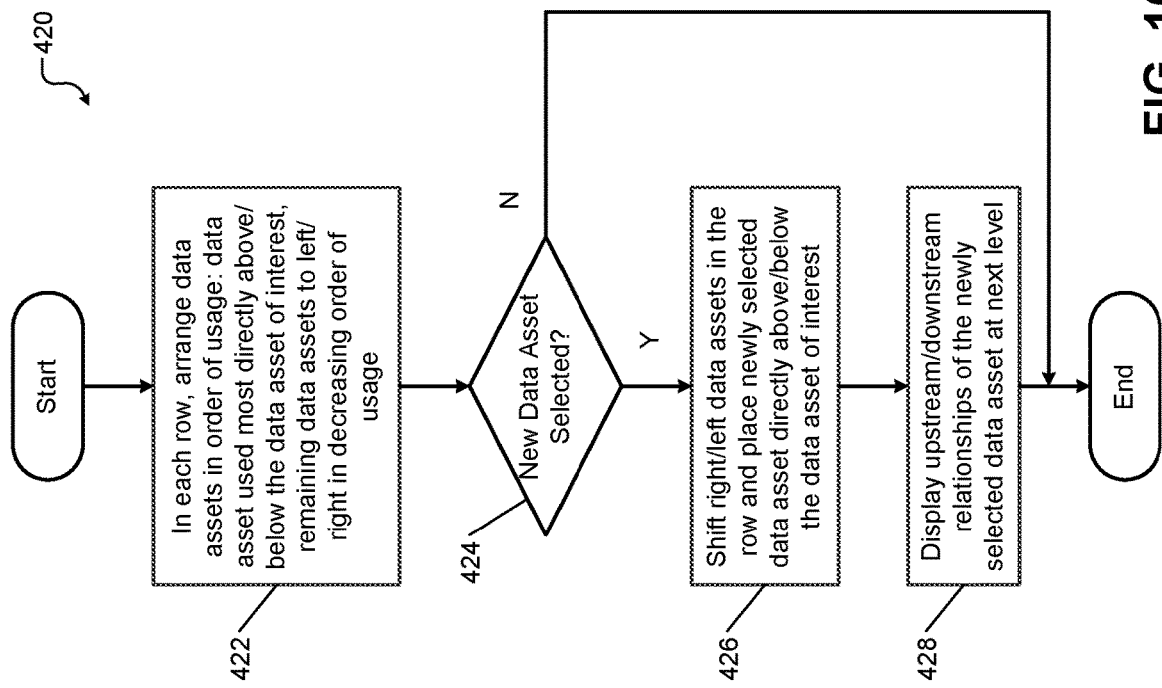
FIGS. 15-20 show flowcharts of methods for displaying lineage data using the lineage data processing system according to the present disclosure.

FIG. 16 shows a method 420 for arranging data assets in a row and for rearranging the data assets in the row in a carousal fashion using the lineage application according to the present disclosure. At 422, control arranges the data assets in each row in order of their usage (their use in generating the primary data asset if upstream from the primary data asset or use of the primary data asset in their generation if downstream from the primary data asset). For example, the data asset that is used most with the primary data asset is arranged directly above or below the primary data asset (depending on whether the row is above (upstream) or below (downstream) the primary data asset). The remaining data assets in the row are arranged to the left and right in decreasing order of their usage with the primary data asset.

At 424, control determines whether a new data asset in a row is selected by the user (e.g., by clicking on (or touching in case of a touch screen) the new data asset) to explore the lineage data of the primary data asset using a different path. At 426, if a new data asset is selected, control shifts the data assets in the row to the left or right to position the newly selected data asset directly above the primary data asset. At 428, control displays the upstream or downstream relationships of the newly selected data asset at the next hierarchical level (e.g., as explained in detail with references to FIGS. 7-10 above). As explained before, the new data asset may be selected in any row.

Figure 17:
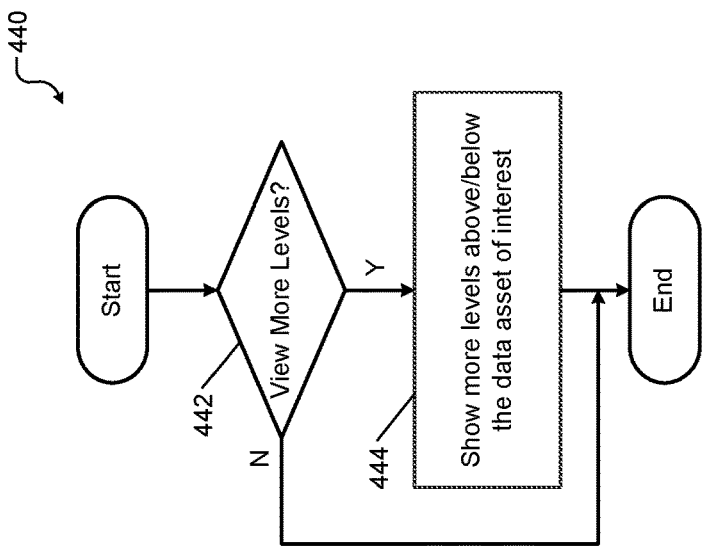

FIG. 17 shows a method 440 for displaying additional hierarchical levels (e.g., one or more of great grandparent, great great grandparent, great grandchild, great great grandchild levels) using the lineage application according to the present disclosure. At 442, control determines whether the user scrolls up or down on the screen indicating an intent to view additional levels of lineage data of the primary data asset. At 444, if the user is interested in viewing the additional levels of lineage data, control displays the additional levels as explained in detail with references to FIGS. 11 and 12.

Figure 18:
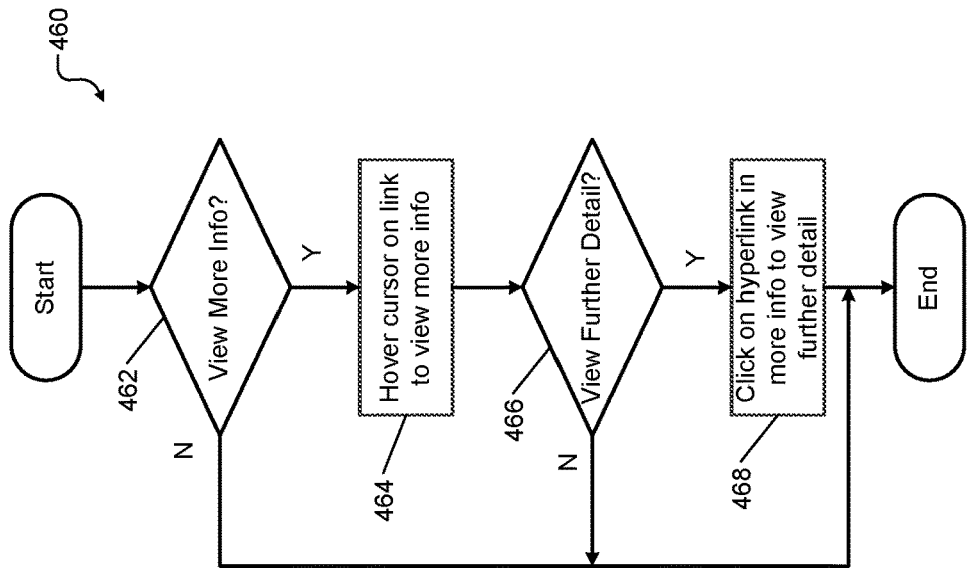

FIG. 18 shows a method 460 for viewing additional information about the data transformation associated with the primary data asset using the lineage application according to the present disclosure. At 462, the user decides whether to view the additional information. At 464, if the user decides to view the additional information, the user moves the cursor over a link between the primary data asset and a data asset directly above or below the primary data asset, or over a link further upstream or downstream from the data asset that is directly above or below the primary data asset. When the user moves the cursor over a link, the lineage application displays the additional information as explained in detail with references to FIGS. 13 and 14. At 466, the user decides whether to view further detail. At 468, if the user decides to view further detail, the user clicks (or touches in case of a touch screen) on a hyperlink displayed in the more information at which point the lineage application displays further information as explained in detail with references to FIGS. 13 and 14.

Figure 19:
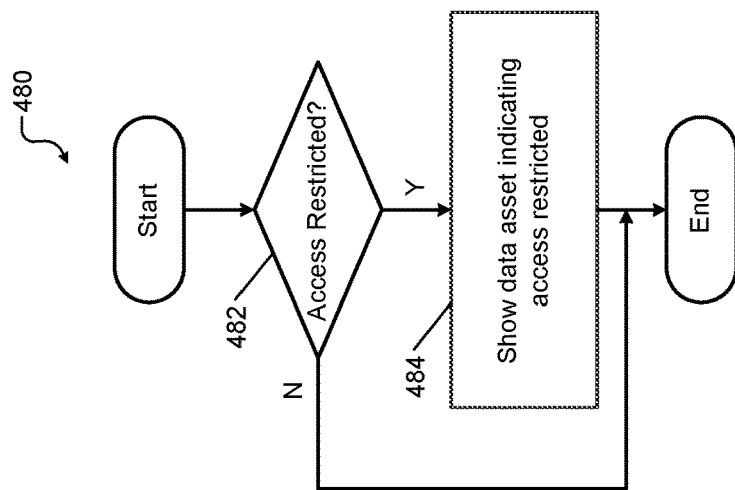

FIG. 19 shows a method 480 for displaying data assets in the lineage path of the primary data asset to which access is restricted. At 482, control determines whether access is restricted to one or more data assets in the lineage path of the primary data asset. At 484, if access is restricted to one or more data assets in the lineage path of the primary data asset, these data assets are displayed but no information about these data assets is displayed other than the fact that access to them is restricted.

Figure 20:
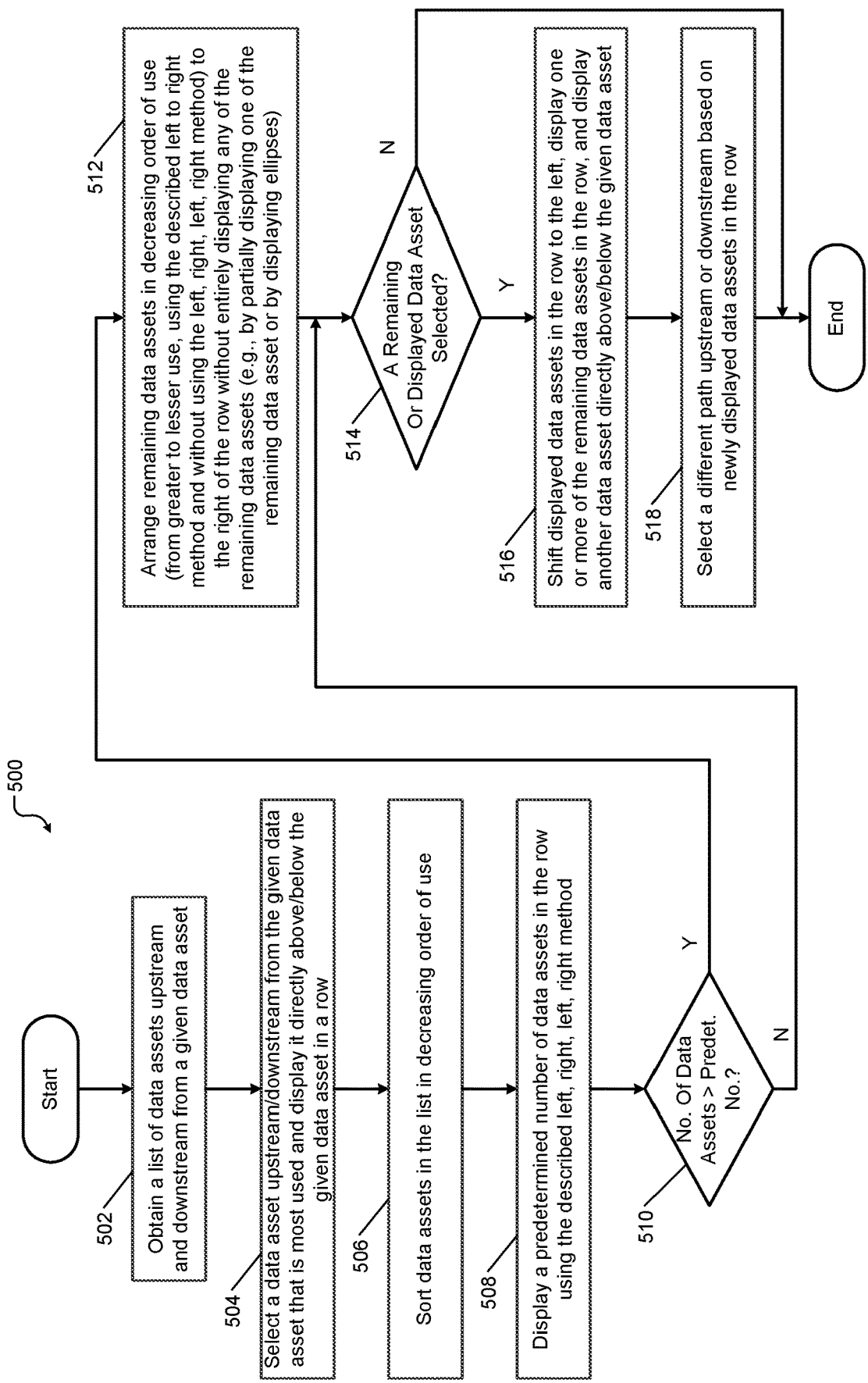

FIG. 20 shows a method 500 for displaying data assets including sorting, arranging, and shifting data assets in a row according to the present disclosure. At 502, control obtains a list of data assets in a data catalog that are upstream and downstream from a given data asset. At 504, control selects a data asset that is upstream or downstream from the given data asset and that is most used upstream or downstream from the given data asset, and control displays the most used data asset directly above or below the given data asset in a row. At 506, control sorts the data assets in the list in a decreasing order of use (i.e., from left to right, from most used to least used). At 508, control displays a predetermined number (e.g., 7) of the sorted data assets in the row using the left, right, left, right method described above.

At 510, control determines if the number of sorted data assets is greater than the predetermined number that can be displayed in the row. At 512, if the number of sorted data assets is greater than the predetermined number that can be displayed in the row, control performs the following: control arranges the remaining data assets from the sorted data assets (i.e., the data assets that are in excess of the predetermined number of data assets that can be displayed in the row) in the decreasing order of their use (i.e., in the sorted order, from greater to lesser use, using the left to right method described above, and without using the left, right, left, right, method described above) to the right of the row. Control arranges the remaining data assets to the right of the row without entirely displaying any of the remaining data assets. Instead, control partially displays one of the remaining data assets to the right of the row, or control displays ellipses to the right of the row.

At 514, subsequent to 512, or if the number of sorted data assets is not greater than the predetermined number of data assets that can be displayed in the row at 510, control determines whether one of the remaining data assets to the right of the row or one of the displayed data assets in the row is selected. At 516, if one of the remaining data assets to the right of the row or one of the displayed data assets in the row is selected, control performs the following: control shifts the displayed data assets in the row to the left, displays one or more of the remaining data assets in the row (if the remaining data assets are selected selected), and displays another data asset directly above/below the given data asset (e.g., the data asset may be any of the remaining data assets, or any data asset selected in the row, or any data asset that is between the most used data asset previously displayed directly above/below the given data asset and the last data asset previously displayed on the right in the row). Control displays no more than the predetermined number of data assets in the row. Any additional remaining data assets on the right are displayed partially or using ellipses to the right of the row. Additionally, any data assets that were displayed earlier but are now shifted out of the row towards the left of the row are also displayed partially or using ellipses to the left of the row. Similar procedure is used to shift the data assets in the row to the right. At 518, control allows the user to select a different path upstream or downstream to explore the lineage of the given data asset based on the newly displayed data assets in the row.

Thus, the systems and methods of the present disclosure solve a specific technical problem plaguing the lineage data industry: how to process and present only limited portions of the lineage data of a data asset of interest, instead of presenting overwhelming amounts of end-to-end lineage data, that will allow the viewer to quickly and effectively search the lineage data, retrieve useful portions of the lineage data by traversing the lineage by selecting a specific path based on the information presented, and thus efficiently analyze the lineage data of the data asset of interest. The systems and methods of the present disclosure display portions of the lineage data at a time, where the portions include simplified summaries that include specific information (e.g., U# and D#) that allow the viewer to quickly and effectively search the lineage data, retrieve useful portions of the lineage data by traversing the lineage by selecting a specific path based on the information presented, and thus efficiently analyze the lineage data of the data asset of interest. The process is augmented by various additional features such as the carousal-like search feature and the feature that provides additional information when the cursor hovers over a link as described above. These features allow the viewer to grasp the lineage data at a glance and to select the lineage path for further searching, retrieving, and analyzing the lineage data in a fast and efficient manner.

The functions/steps of processing the displayed hierarchical information in a specific format, i.e., a predetermined plural number of hierarchical levels on a single screen, and allowing selection and display of additional information at higher levels provide information to the user in the form of a technical tool for an intellectual task he or she has to master, and hence contribute to the technical solution of the technical problem of an efficient search, retrieval, and evaluation of lineage data insofar as this is supported by the specific display format chosen. In this respect, it is neither mere aspects of art design, like a pleasant look or feeling, that matter, nor the mere information content of levels presented, but the organization of an overall display structure in view of a technical problem.

The systems and methods solve this problem by providing a set of lineage data processing functions (e.g., the carousal and hovering features described above), which, when applied in a concerted manner by the user as described above, ensure a time-saving and well-manageable search operation as compared to the prior art. In the technical context of a lineage database storing hierarchical information, these functions combine to yield a fast, easy to handle, and in summary, an efficient searching tool, which goes beyond the mere aggregation of normal design options.

The systems and methods of the present disclosure do not merely render information in an artistic manner but render limited and specific information about the lineage of a selected data asset in a focused manner that allows a user to select and follow a lineage path upstream or downstream from the selected data asset, where the selection of the lineage path is based on the specific information (U# and D#) presented in the displayed summaries of the data assets at plural levels. Notably, the entire end-to-end lineage data of the selected data asset at all hierarchical levels is not displayed, which can overwhelm the viewer with a lot of information that is difficult to view and analyze. Instead, the viewer can select, search, retrieve, and analyze the lineage data of the selected data asset in limited portions selected efficiently based on the specific information (U# and D#) provided in the displayed summaries and the additional information displayed by hovering cursor over links between the plural levels. This is a significant technical effect and improvement over the prior art in the technical field of lineage data presentation and analysis.

Although human interaction is involved in solving the problem of how to display limited lineage data and present information at a glance that allows efficiently and interactively selecting a path upstream or downstream to further search, retrieve, and analyze the lineage data in portions at a time, which interaction may relate to the information content of hierarchical levels looked for and may be motivated by personal interests and/or other non-technical preferences, the features relating to the format of the hierarchical levels displayed are not presentation of information as such. Instead, the arrangement of summaries on the screen is determined by technical considerations that aim at enabling the user to manage the technical task of searching and retrieving images in a more efficient and faster manner than the prior art. Further, the use of information (e.g., the functional data U# and D#) in the summaries and the additional information displayed by hovering cursor over links between plural levels in the technical system reflects the properties of the technical system.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
    a processor; and machine readable instructions, stored on a tangible machine readable medium, when executed by the processor, configure the system to:
        process data associated with lineage of a selected data asset, the data being maintained in a data asset catalog including linear representations associated with a collection of data assets including the selected data asset, the processed data indicating relationship information between data assets referenced within the data asset catalog, the relationship information indicating a relationship of the selected data asset with upstream data assets and downstream data assets, wherein the upstream data assets have contributed to the selected data asset, and wherein the selected data asset has contributed to the downstream data assets;
        analyzing the relationship of the selected data asset from the data asset catalog to select a subset of the upstream data assets and the downstream data assets based at least in part on usage in the data asset catalog;
        cause a summary of the selected data asset to be displayed in a user interface, wherein the summary of the selected data asset includes an identifier of the selected data asset, a first indicator that indicates a number of relationships of the selected data asset with data assets that are one level upstream from the selected data asset, and a second indicator that indicates a number of relationships of the selected data asset with data assets that are one level downstream from the selected data asset;
        cause first summary information corresponding to at least some of the data assets that are one level upstream from the selected data asset to be displayed in the user interface; and
        cause second summary information corresponding to at least some of the data assets that are one level downstream from the selected data asset to be displayed in the user interface.

2. The system of claim 1 wherein the machine readable instructions further configure the system to:
    inspect information stored in the data asset catalog regarding data assets and instruments used to transform the data assets;
    capture information about data assets that are transformed by the instruments and information about the instruments that transformed the data assets;
    track, based on the captured information, relationships of data assets with other data assets and with the instruments used to transform the data assets;
    generate, based on the tracking, a network of relationships of data assets with other data assets and with the instruments used to transform the data assets; and
    generate summaries from the network of relationships.

3. The system of claim 1 wherein:
    the selected data asset is related to a plurality of upstream data assets and a plurality of downstream data assets;
    the first summary information is displayed for only a subset of the plurality of upstream data assets; and
    the second summary information is displayed for only a subset of the plurality of downstream data assets.

4. The system of claim 1 wherein the machine readable instructions further configure the system to:
    generate, based on the processed data, summaries of a first set of data assets for displaying at a first position relative to the summary of the selected data asset;
    a summary of a first data asset in the first set of data assets to be displayed at a selected position relative to the summary of the selected data asset, the first data asset being used most among the first set of data assets; and
    summaries of remaining data assets in the first set of data assets being arranged on alternating sides of the first data asset in a decreasing order of use of the remaining data assets.

5. The system of claim 1 wherein the machine readable instructions further configure the system to:
    generate, based on the processed data, for displaying at a first position relative to the summary of the selected data asset, summaries of a first set of data assets identified as being one level upstream or downstream in the summary of the selected data asset;
    generate, based on the processed data, for displaying at a selected position relative to the summary of the selected data asset, a summary of a first data asset in the first set of data assets; and
    generate, based on the processed data, for displaying at a second position relative to the summaries of the first set of data assets, summaries of a second set of data assets identified as being one level upstream or downstream in the summary of the first data asset.

6. The system of claim 1 wherein the machine readable instructions further configure the system to:
    generate, based on the processed data, summaries of a first set of data assets for displaying at a first position relative to the summary of the selected data asset, a summary of a first data asset in the first set of data assets to be displayed at a selected position relative to the summary of the selected data asset;
    generate, based on the processed data, for displaying at a second position relative to the summaries of the first set of data assets, summaries of a second set of data assets identified as being one level upstream or downstream in the summary of the first data asset; and
    in response to a summary of a second data asset from the first set of data assets being selected:
and
reposition the summary of the second data asset for display at the selected position; replace, for display, the summaries of the second set of data assets with summaries
of a third set of data assets identified as being one level upstream or downstream in the summary of the second data asset.

7. The system of claim 1 wherein the machine readable instructions further configure the system to generate, for displaying, based on the processed data, summaries of data assets at an additional level upstream or downstream from the selected data asset by repositioning the summaries of data assets from one or more levels upstream or downstream from the selected data asset.

8. The system of claim 1 wherein the data associated with the lineage of the selected data asset includes data from one or more computer programs developed by one or more software vendors.

9. The system of claim 1 wherein in response to access to a data asset at least one level upstream or downstream from the selected data asset being restricted due to security, the machine readable instructions further configure the system to generate, for displaying, based on the processed data, a summary of the data asset, the summary of the data asset including an indication that access to the data asset is restricted due to security.

10. The system of claim 1 wherein the machine readable instructions further configure the system to:
generate, for displaying, based on the processed data, a link between the summary of the selected data asset and a summary of a data asset that is at least one level upstream or downstream from the selected data asset; and
generate, for displaying, based on the processed data, additional information about the lineage of the selected data asset in response to a cursor being positioned over the link.

11. The system of claim 10 wherein the additional information includes a hyperlink for providing further information about the lineage of the selected data asset and wherein the machine readable instructions further configure the system to generate, for displaying, based on the processed data, the further information in response to the hyperlink being selected.

12. A method executed by a data processing system for analyzing lineage data, the method comprising:
processing, by the data processing system, data associated with lineage of a selected data asset, the data being maintained in a data asset catalog including linear representations associated with a collection of data assets including the selected data asset, the processed data indicating relationship information between data assets references within the data asset catalog, the relationship information indicating a relationship of the selected data asset with upstream data assets and downstream data assets, wherein the upstream data assets have contributed to the selected data asset, and wherein the selected data asset has contributed to the downstream data assets;
analyzing the relationship of the selected data asset from the data asset catalog to selecting a subset of the upstream data assets and the downstream data assets based at least in part on usage in the data asset catalog;
cause a summary of the selected data asset to be displayed in a user interface, wherein the summary of the selected data asset includes an identifier of the selected data asset, a first indicator that indicates a number of relationships of the selected data asset with data assets that are one level upstream from the selected data asset, and a second indicator that indicates a number of relationships of the selected data asset with the data assets that are one level downstream from the selected data asset;
cause first summary information corresponding to at least some of the data assets that are one level upstream from the selected data asset to be displayed in the user interface; and
cause second summary information corresponding to at least some of the data assets that are one level downstream from the selected data asset to be displayed in the user interface.

13. The method of claim 12 further comprising:
inspecting information stored in the data asset catalog regarding data assets and instruments used to transform the data assets;
capturing information about data assets that are transformed by the instruments and information about the instruments that transformed the data assets;
tracking, based on the captured information, relationships of data assets with other data assets and with the instruments used to transform the data assets;
generating, based on the tracking, a network of relationships of data assets with other data assets and with the instruments used to transform the data assets; and
generating summaries from the network of relationships.

14. The method of claim 12 further comprising:
generating, based on the processed data, summaries of a first set of data assets for displaying at a first position relative to the summary of the selected data asset;
a summary of a first data asset in the first set of data assets to be displayed at a selected position relative to the summary of the selected data asset, the first data asset being used most among the first set of data assets; and
summaries of remaining data assets in the first set of data assets being arranged on alternating sides of the first data asset in a decreasing order of use of the remaining data assets.

15. The method of claim 12 further comprising:
generating, based on the processed data, for displaying at a first position relative to the summary of the selected data asset, summaries of a first set of data assets identified as being one level upstream or downstream in the summary of the selected data asset;
generating, based on the processed data, for displaying at a selected position relative to the summary of the selected data asset, a summary of a first data asset in the first set of data assets; and
generating, based on the processed data, for displaying at a second position relative to the summaries of the first set of data assets, summaries of a second set of data assets identified as being one level upstream or downstream in the summary of the first data asset.

16. The method of claim 12 further comprising:
generating, based on the processed data, summaries of a first set of data assets for displaying at a first position relative to the summary of the selected data asset, a summary of a first data asset in the first set of data assets to be displayed at a selected position relative to the summary of the selected data asset;
generating, based on the processed data, for displaying at a second position relative to the summaries of the first set of data assets, summaries of a second set of data assets identified as being one level upstream or downstream in the summary of the first data asset; and
in response to a summary of a second data asset from the first set of data assets being selected repositioning the summary of the second data asset for display at the selected position; and replacing, for display, the summaries of the second set of data assets with summaries of a third set of data assets identified as being one level upstream or downstream in the summary of the second data asset.

17. The method of claim 12 further comprising generating, for displaying, by the data processing system, based on the processed data, summaries of data assets at an additional level upstream or downstream from the selected data asset by repositioning the summaries of data assets from one or more levels upstream or downstream from the selected data asset.

18. The method of claim 12 further comprising:

generate, for displaying, based on the processed data, a link between the summary of the selected data asset and a summary of a data asset that is at least one level upstream or downstream from the selected data asset; and generate, for displaying, based on the processed data, additional information about the lineage of the selected data asset in response to a cursor being positioned over the link, wherein the additional information includes identification of a computer program associated with transforming the data assets whose summaries are linked by the link, or wherein the additional information includes a hyperlink for providing further information about the lineage of the selected data asset in response to the hyperlink being selected.

\* \* \* \* \*